United States Patent [19]

Liston

[11] 3,748,044

[45] July 24, 1973

[54] DIGITAL CHEMICAL ANALYSIS APPARATUS

[75] Inventor: Max D. Liston, Irvine, Calif.

[73] Assignee: Abbott Laboratories, North Chicago, Ill.

[22] Filed: Apr. 12, 1971

[21] Appl. No.: 133,081

Related U.S. Application Data

[63] Continuation-in-part of Ser. No. 854,647, Sept. 2, 1969, Pat. No. 3,664,744.

[52] U.S. Cl.................... 356/180, 23/253, 73/53, 141/8, 222/129, 250/226, 235/151.35, 356/39, 356/98, 356/184, 356/201, 356/246
[51] Int. Cl...... G01j 3/46, G01n 33/16, G01n 1/10
[58] Field of Search................. 250/226; 356/39, 356/96, 97, 98, 101, 179, 180, 184, 186, 189, 195, 201, 204, 205, 208, 223, 246; 23/253; 235/151.34; 73/53, 423 A, 425.2

[56] References Cited
UNITED STATES PATENTS

| | | | |
|---|---|---|---|
| 3,542,515 | 11/1970 | Scott.................................. | 356/95 |
| 3,344,702 | 10/1967 | Wood et al....................... | 356/179 |
| 3,528,749 | 9/1970 | Bowker............................. | 356/223 |
| 3,567,393 | 3/1971 | Welch............................... | 356/186 |
| 2,879,141 | 3/1959 | Skeggs.............................. | 356/246 |
| 3,089,382 | 5/1963 | Hecht et al...................... | 356/96 |
| 3,247,758 | 4/1966 | Turner.............................. | 356/101 |
| 3,266,298 | 8/1966 | Whitehead et al............... | 73/53 |
| 3,471,242 | 10/1969 | Nichols............................. | 356/189 |
| 3,561,875 | 2/1971 | Ried, Jr. et al.................. | 356/205 |
| 3,526,125 | 9/1970 | Gilford et al.................... | 73/53 |

Primary Examiner—Ronald L. Wibert
Assistant Examiner—J. P. McGraw
Attorney—Molinare, Allegretti, Newitt & Witcoff

[57] ABSTRACT

The disclosure describes an improved system for evaluating rates of reactions and end point determinations that take place within a plurality of individaul secimens. The system includes a cuvette for holding each of the specimens in an individual compartment. Analyzing apparatus is used to generate and sequentially transmit a beam of radiant energy through each of the specimens. The analysis apparatus also produces an analysis signal having a value proportional to a property of a particular specimen each time the beam passes through that specimen. Cycling apparatus causes the beam to sequentially and separately pass through each of the specimens during multiple cycles of operation. During the first cycle of operation, a first set of analysis signals having a first set of values corresponding to the specimens is created. Likewise, during a second cycle of operation, a second set of analysis signals having a second set of values corresponding to the specimens is created.

In order to determine the rate at which the reactions take place within each of the specimens, a memory is used to store at least the first set of values. Then, during the second cycle of operation, a processing circuit compares the values of the first and second sets of values which correspond to the same specimen. In this way, the rate of reaction of each specimen is automatically determined. By a similar technique, values can be created and compared in seconds in order to determine rates of reactions that proceed rapidly.

In order to analyze end joint determinations, one of the specimens comprises a known concentration of a substance, and other specimens contain unknown concentrations of the substance. The value corresponding to the known concentration is stored in the memory, and other values correspndingly to the unknown concentration are compared with the value stored in the memory.

Improved components of the system such as a cuvette, a specimen dispenser, and an analyzing apparatus are also disclosed in the specification.

The analyzing apparatus preferably comprises apparatus for instantaneously determining the concentration of a predetermined substance that absorbs radiant energy within a predetermined band of wavelengths in the presence of other interfering substances that also absorb radiant energy in the region of the predetermined band. The determination is made by generating multiple wavelengths of radiant energy. The radiant energy is then sequentially transmitted in a single path through the substances, and the transmission is periodically interrupted by means which prevent the transmission of any radiation. The intensities of the radiant energy transmitted through the substances at the various wavelengths are then compared by electronic apparatus.

15 Claims, 46 Drawing Figures

United States Patent [19]
Liston
[11] 3,748,044
[45] July 24, 1973
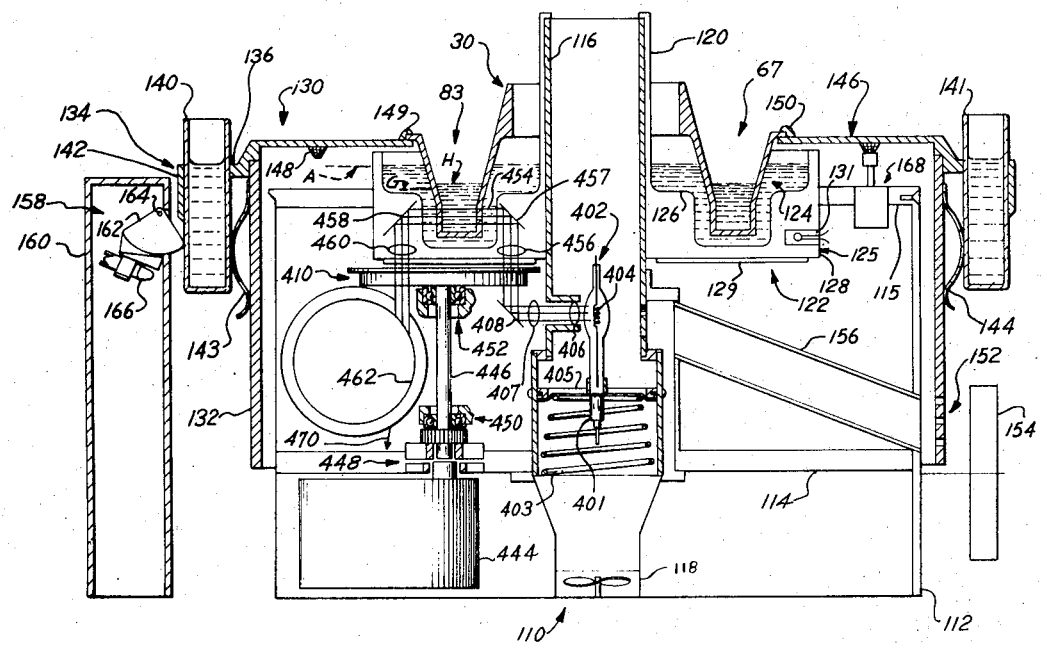

INVENTOR.
MAX D. LISTON

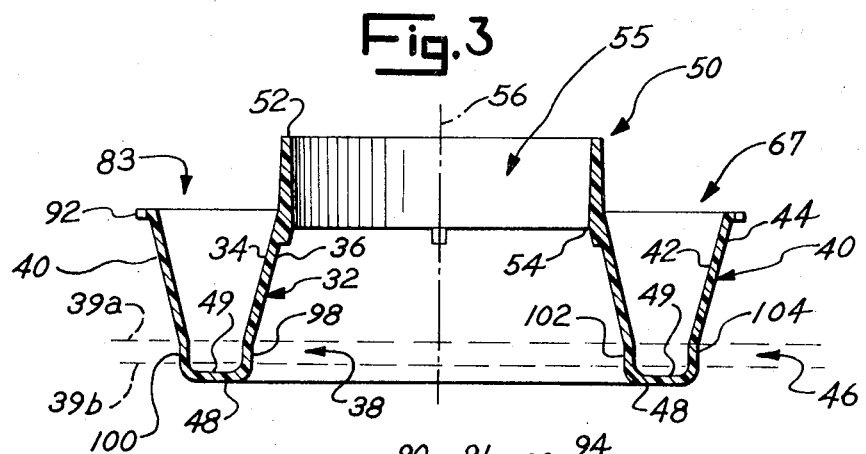
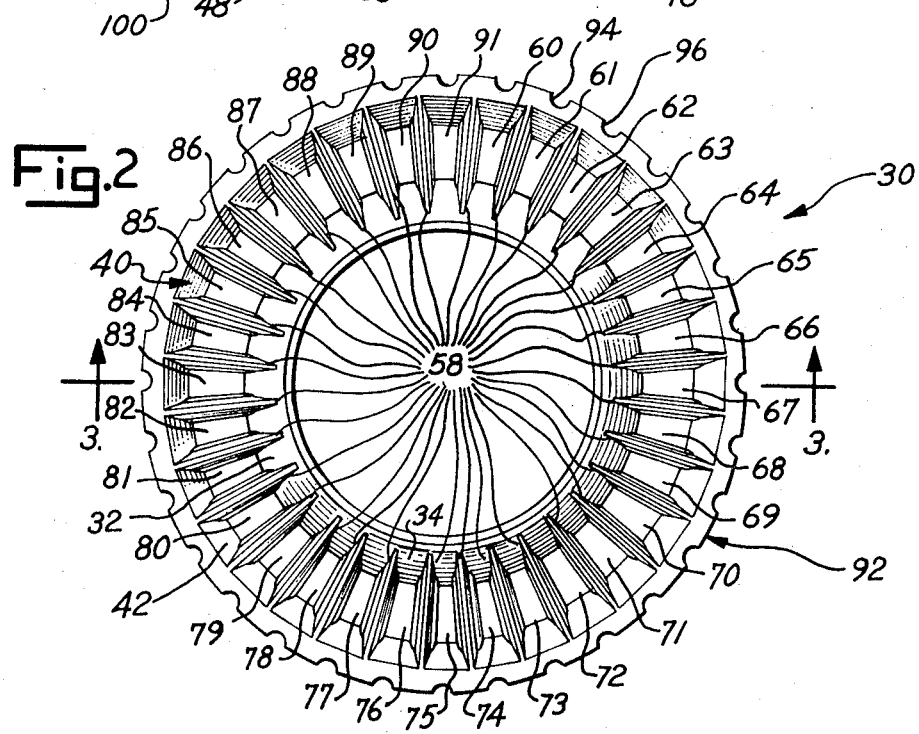
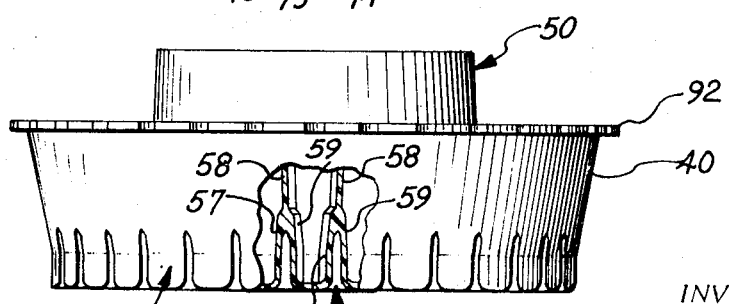

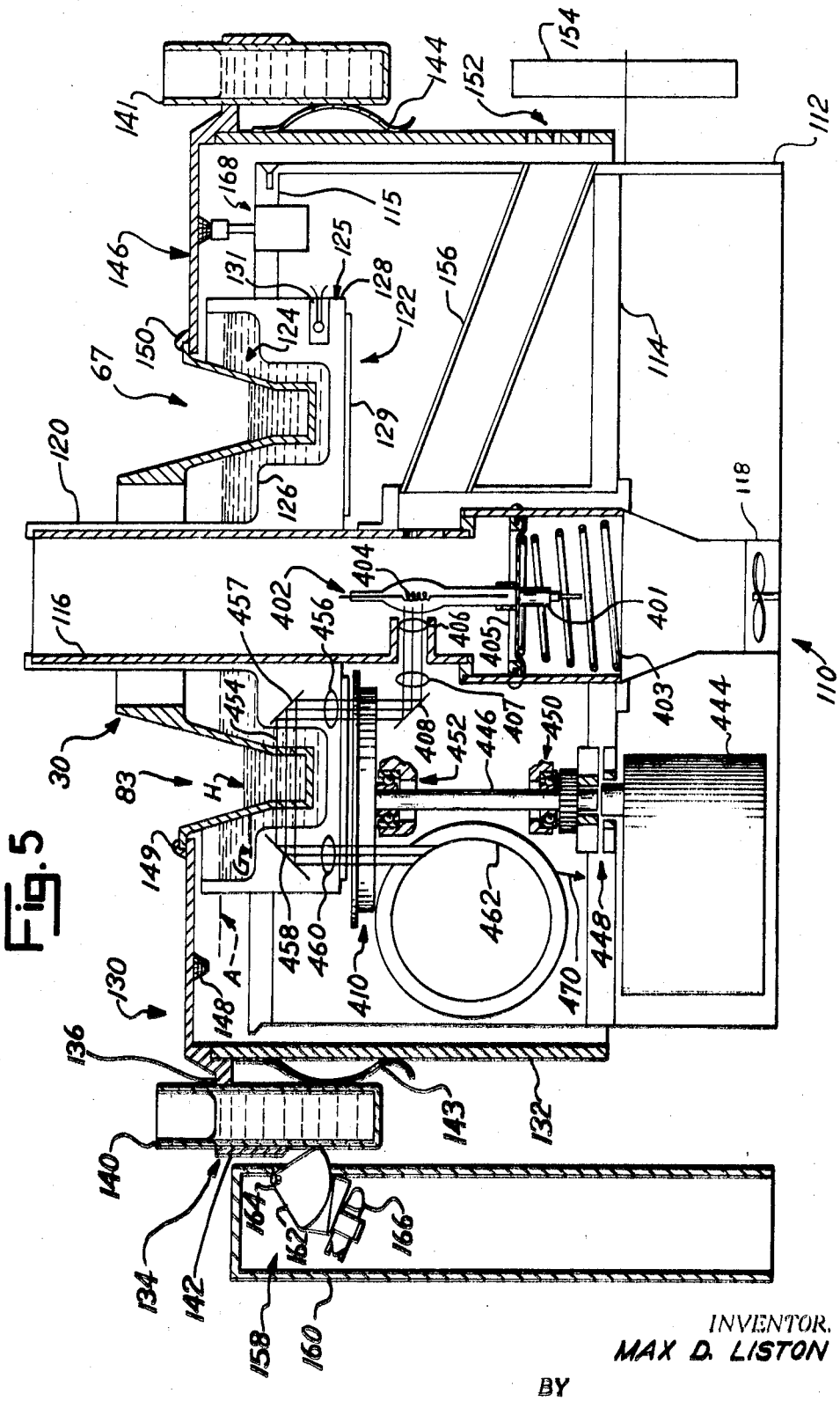

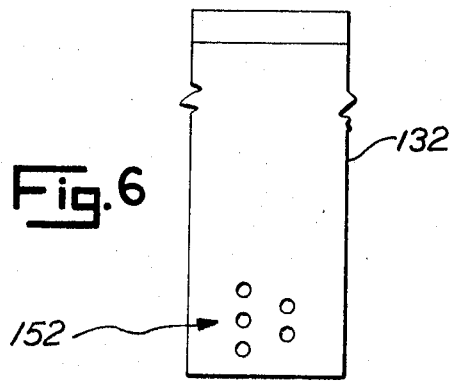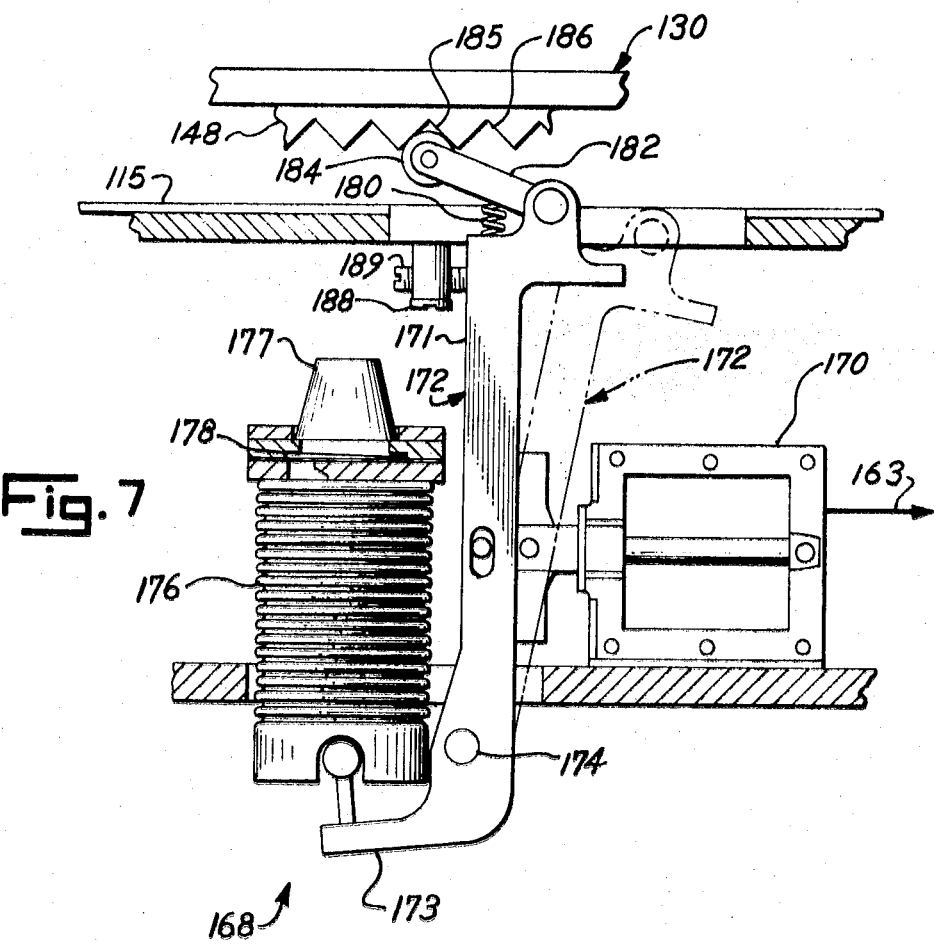

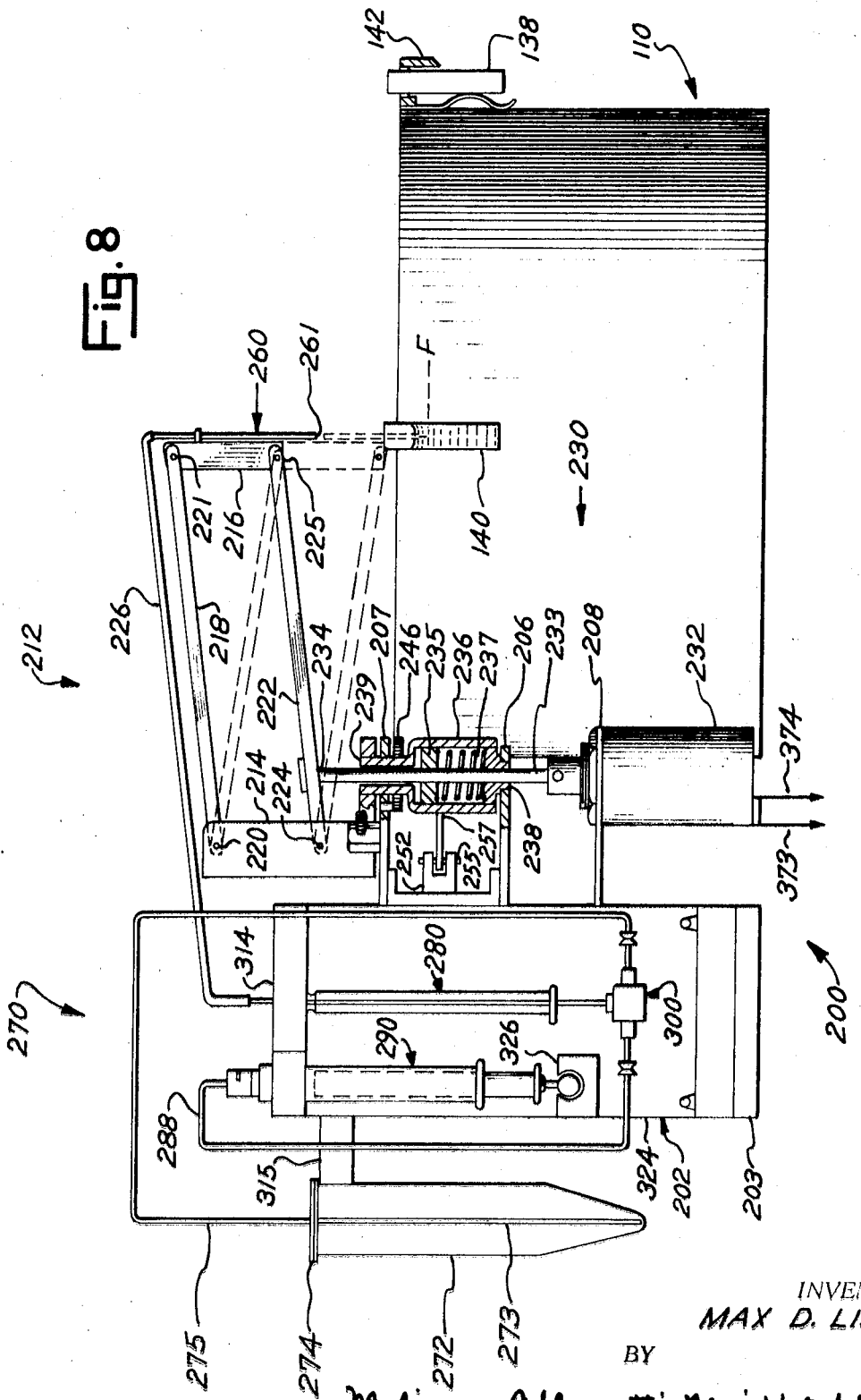

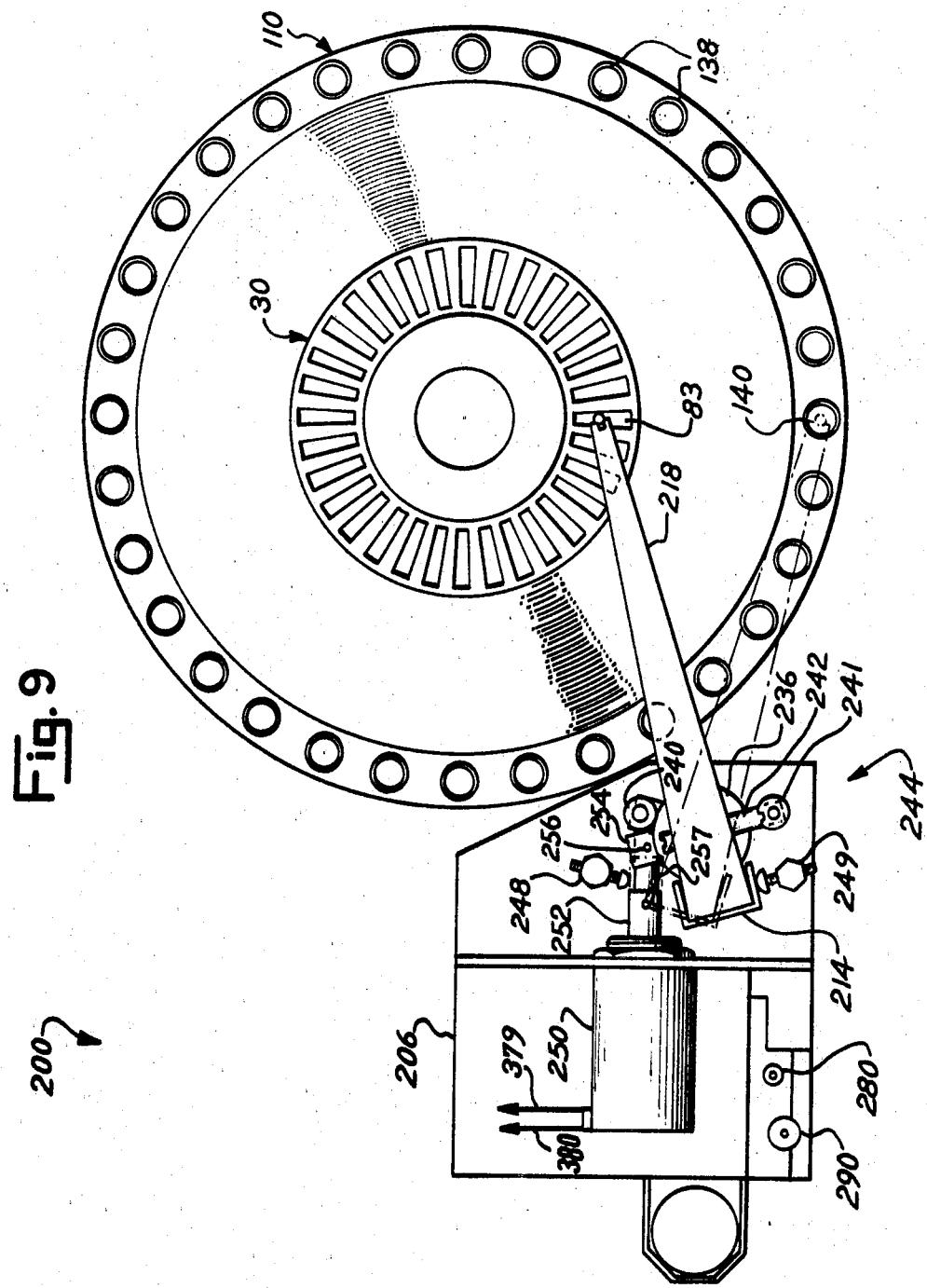

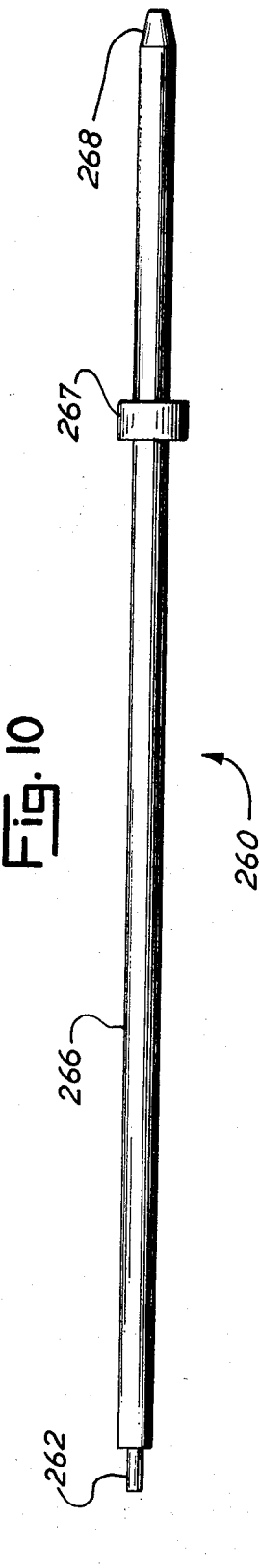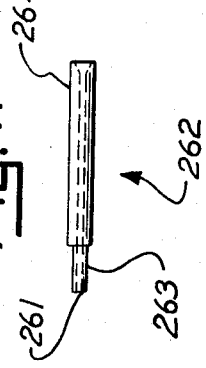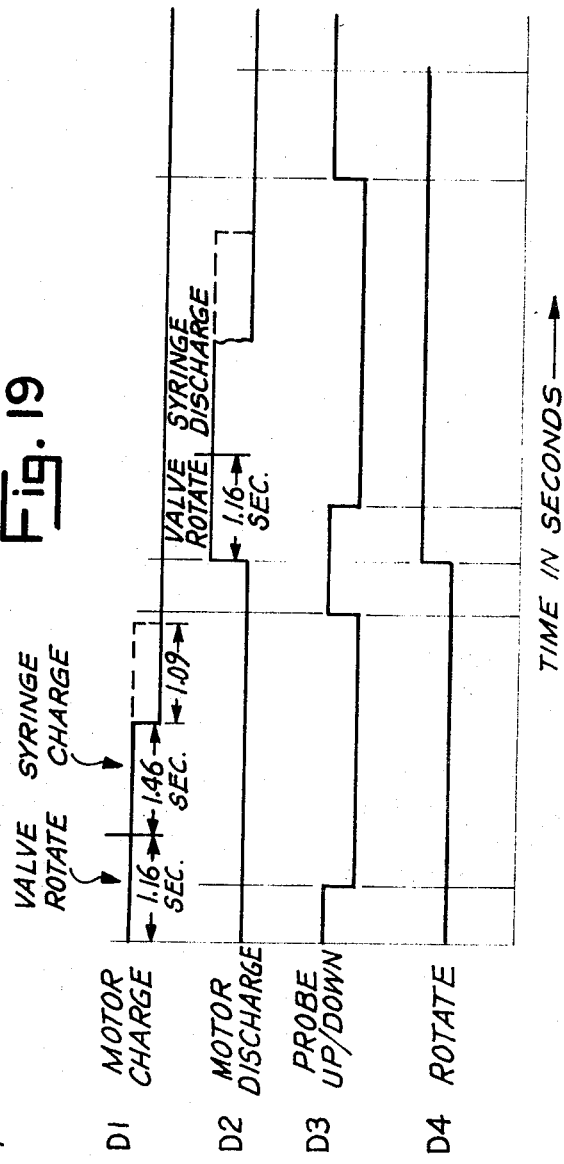

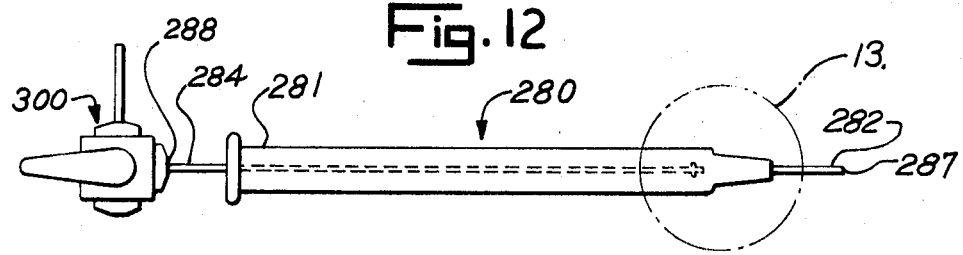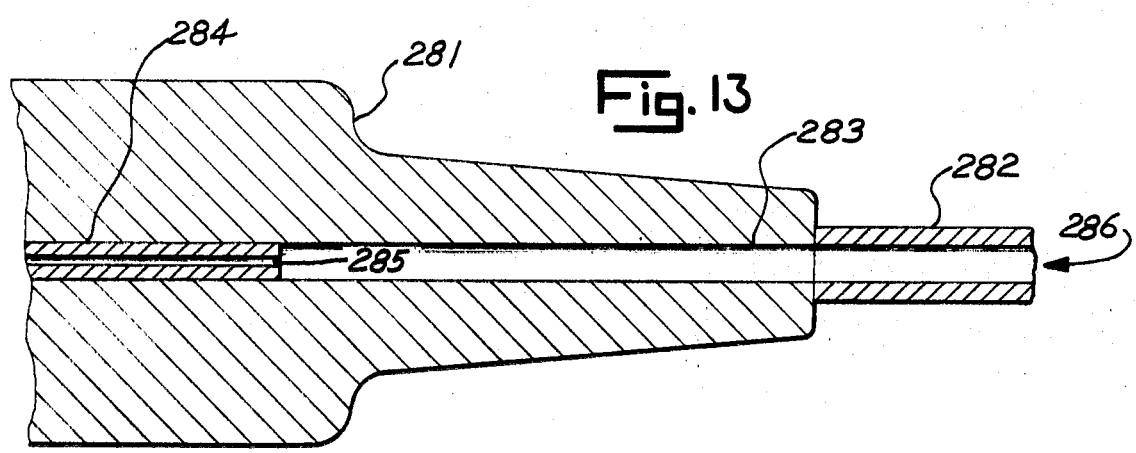

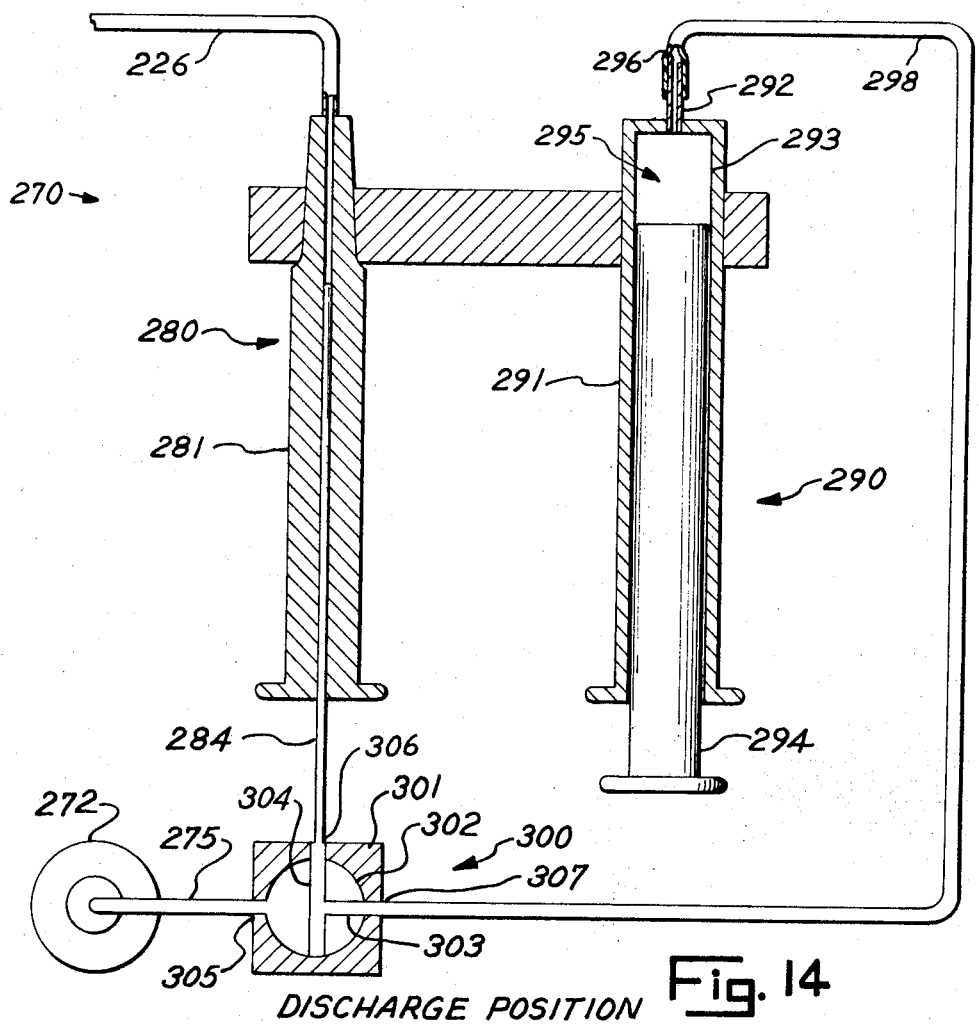
Fig. 14 DISCHARGE POSITION
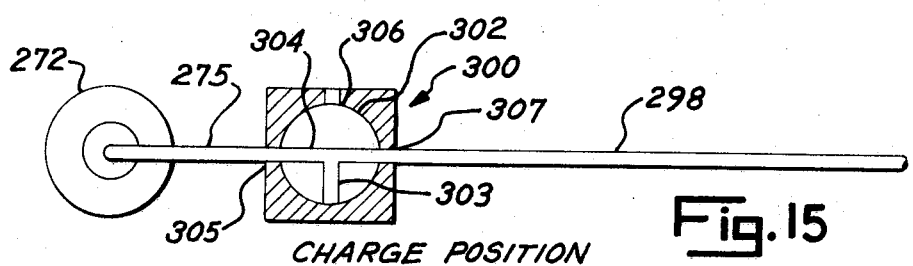
Fig. 15 CHARGE POSITION

INVENTOR.
MAX D. LISTON

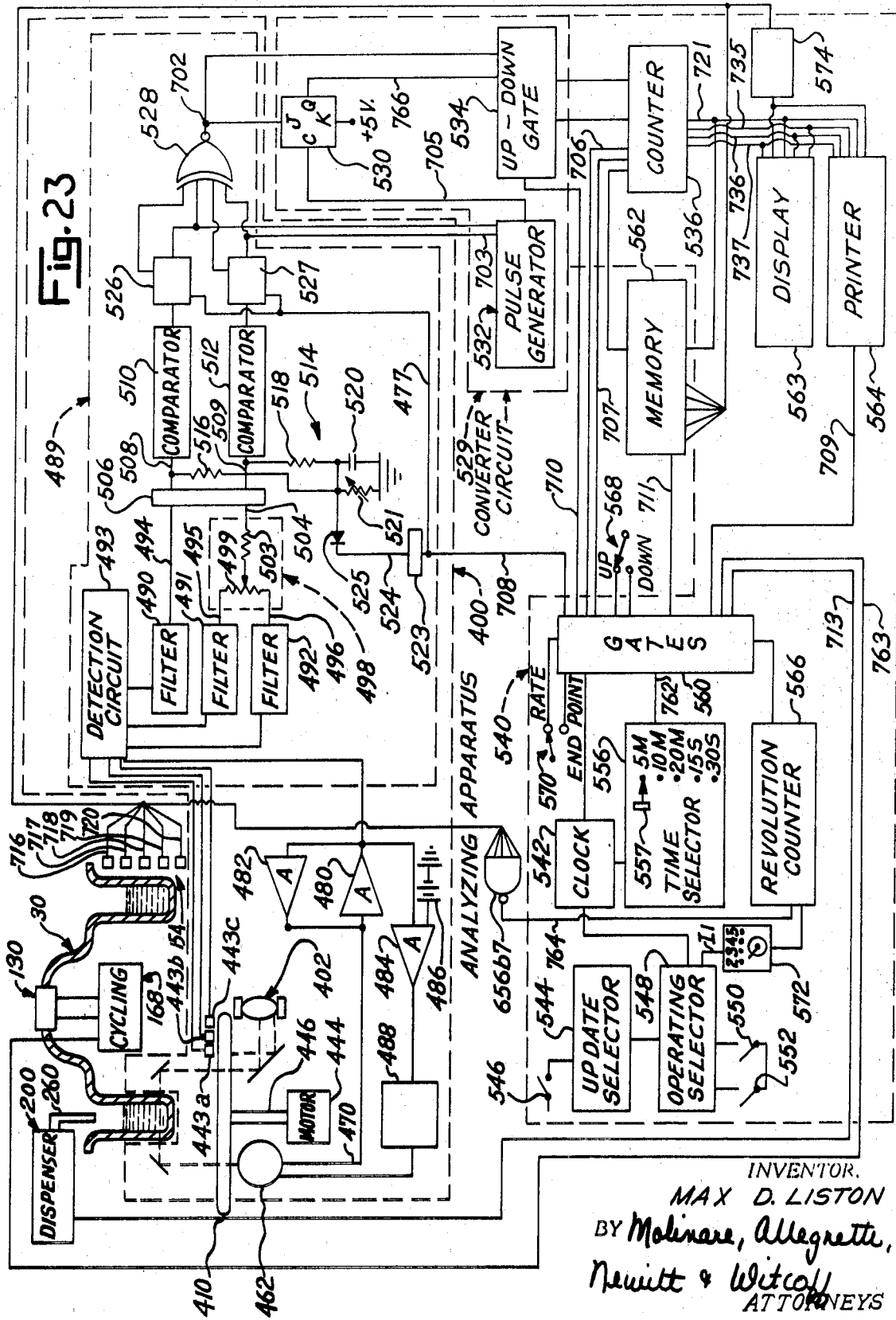

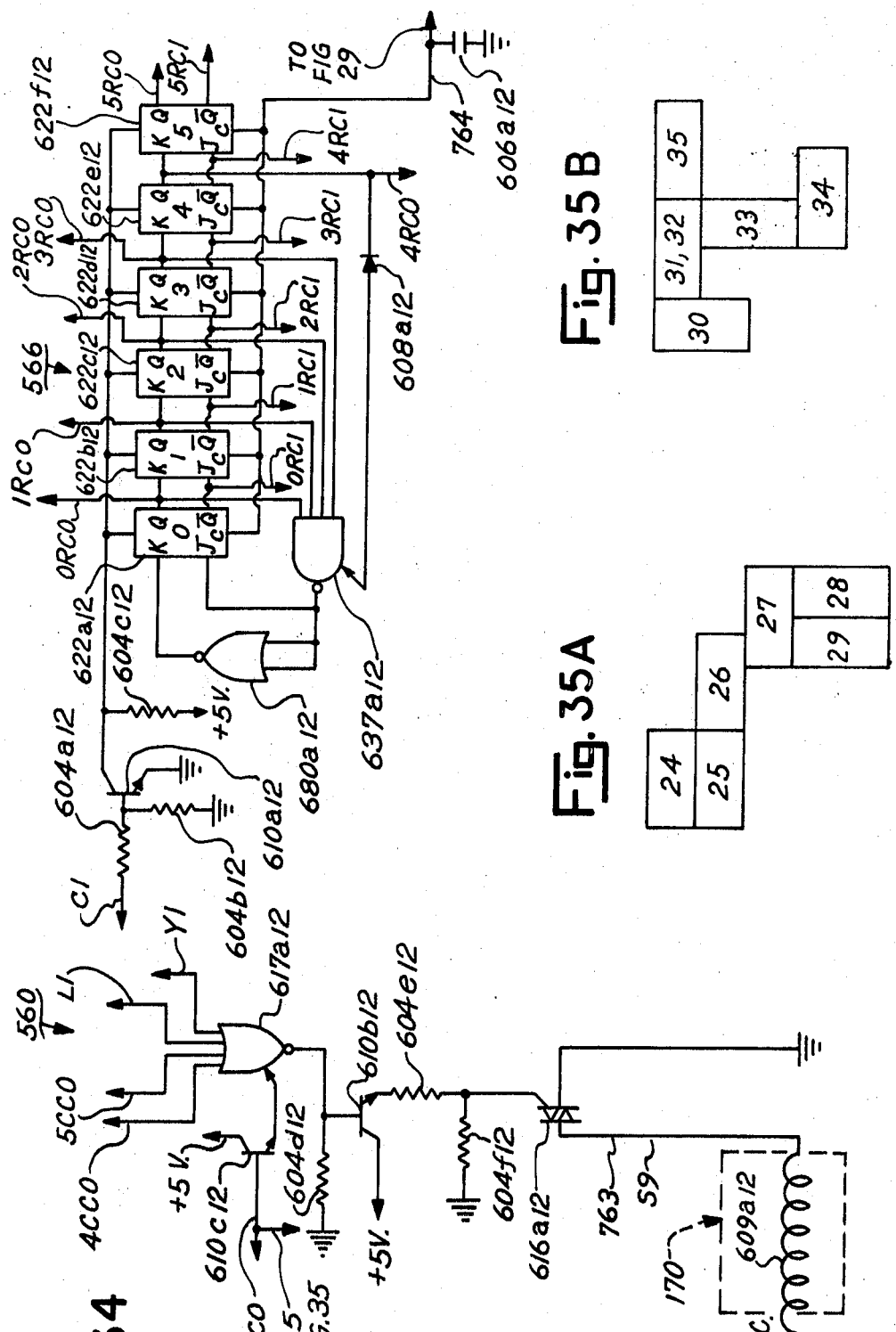

DIGITAL CHEMICAL ANALYSIS APPARATUS

RELATED APPLICATION

This application is a continuation-in-part of my application Ser. No. 854,647, now U.S. Pat. No. 3,664,744, filed Sept. 2, 1969 entitled "Log Ratio Meter."

BACKGROUND OF THE INVENTION

1. Field of the Invention

This invention relates to chemical analysis techniques, and more particularly relates to method and apparatus for analyzing substances by radiant energy.

2. Description Of The Prior Art Known To Applicant

In order to rapidly analyze the concentration of a particular substance present in a chemical specimen, such as blood, chemists are placing increasing reliance on various types of machines. Such machines devised in the past may be divided into at least the following types:

1. Blood gas analyzers;
2. Prothrombin time determining systems;
3. Flow systems;
4. Electromechanical methods not related to colorimetry; and
5. Monochromatic servomechanism systems.

Although such machines have somewhat reduced the labor involved in performing chemical analysis, they have exhibited many deficiencies that have limited their overall usefulness. For example, some of these machines rely on servomechanisms employing many mechanical parts. Such systems are notoriously difficult to keep in adjustment and balance due to the variation in part tolerance and due to mechanical wear of the parts. In addition, such systems measure the rate of reaction in only a single specimen at a time. This is a serious limitation, since many chemical reactions proceed slowly, and must be analyzed over a period of 5 minutes or more. In addition, when colorimetric determinations are conducted, such systems must generally wait for the end point of the reaction to be reached before analysis can proceed with accuracy.

Technicians have also noted the difficulty of loading and cleaning the specimen dispensers and cuvettes of prior art systems. Such difficulties are particularly pronounced when flow-through cuvettes are utilized. These cuvettes provide a single chamber for analyzing multiple specimens that must be purged with a relatively large volume of specimen fluid each time a new specimen is introduced into the chamber. Prior art systems also fail to mix the specimen and reagent with the degree of accuracy desired by most chemists. Aside from these deficiencies, prior systems generally cannot operate with their radiant energy transmitting systems exposed to ambient light.

Another failing of prior art systems is their inability to compensate for substances in a specimen which tend to absorb some radiant energy in the same band of wavelengths as the substance under analysis. This is a most serious failing, because it produces significant inaccuracies in the results. Two of the best known methods of avoiding these inaccuracies are to physically separate the desired substance from the intefering substances, or to perform a so-called "Allen" correction. In many cases, the physical separation of the substance is almost impossible to achieve, and at best, it is a time-consuming and costly process. The Allen method of correction requires the set up of cumbersome laboratory equipment and the laborious hand calculation of values derived from the use of the equipment. Since this method is time-consuming, it cannot be used to make accurate corrections while the interfering substances and the desired substance are reacting.

Certain bichromatic systems which measure the difference in the absorbence of light transmitted through a specimen at different wavelengths have also been used in the past. One such system is described in U. S. Pat. No. 2,640,389 issued June 2, 1953 in the name of the applicant. Another such system is the Bilirubinometer manufactured by the American Optical Company, Keene, N.H. Although these systems perform many useful functions, their overall usefulness has been limited because they fail to provide a reference level against which the level of the bichromatic signals can be measured.

SUMMARY OF THE INVENTION

Applicant has invented a unique system for analyzing reactions that take place within a plurality of individual specimens. According to a principal feature of the system, applicant provides a unique dispenser that transfers specimens to a cuvette means for holding each of the specimens in an individual compartment. Analyzing means are also used to generate and transmit a beam of radiant energy through the specimens. This mode of operation produces an analysis signal having a value proportional to a property of a predetermined specimen each time the beam passes through that specimen. Each time the beam passes through a specimen, address means generate an identity code that uniquely identifies that specimen. Cycling means are employed for causing the beam to separately pass through each of the specimens during multiple cycles of operation. For example, during a first cycle of operation, a first set of analysis signals having a first set of values corresponding to the specimens may be created. Likewise, during a second cycle of operation, a second set of analysis signals having a second set of values could be created. Memory means for instantaneously storing the values of the analysis signals at addresses corresponding to the predetermined specimens are also utilized. Electronic processing means are used to enable the cycling means and memory means, as well as to compare the values stored in the memory means with additional values created by the analyzing means in order to evaluate the reactions taking place in the specimens. Use of the foregoing combination of components results in a flexible system capable of rapidly performing a variety of analyzing tasks.

For example, in order to determine the rate at which relatively slow reactions take place within each of the specimens, the memory means are used to store the first set of values created during a first cycle of operation. Then, while the second cycle of operation is creating the second set of values, processing means compare the values of the first and second sets of values which correspond to the same specimen. In this way, the rates of reaction of all the specimens are determined during the same period of time.

In order to determine the rate at which a rapid reaction takes place within a predetermined specimen, beams of radiant energy are passed through the predetermined specimen at specified short intervals, such as every 15 seconds. This mode of operation results in a set of time-spaced analysis signals that are sequentially stored in the memory means. The processing means then compares the value of each succeeding analysis signal with the value of a previous analysis signal stored in the memory means. In this manner, the rate of the reaction may be accurately determined over short time intervals.

In order to analyze an end point determination, one of the specimens comprises a known concentration of a substance, and other specimens contain unknown concentrations of the substance. The value corresponding to the known concentration is stored in the memory means and other values corresponding to the unknown concentrations are compared with the value stored in the memory means by the processing means.

According to another feature of the system, the cuvette means preferably comprises integrally-formed sidewalls and spacer means that define compartments in which the specimens may be introduced. Opposed, planar window means for transmitting radiant energy may also be provided in the compartments so that the specimens may be analyzed with a degree of accuracy unattained by systems employing curved windows, such as test tubes. By integrally fabricating the sidewall and spacer means from the plastic material described herein, the cuvette means is rendered disposable, thereby eliminating the most common cause of specimen contamination.

According to another feature of the system, the dispenser comprises two cavities, such as syringe barrels, each fitted with means for changing the volume of the cavities, such as plungers. By interconnecting the barrels and plungers in the manner described herein, applicant has found that the dispenser will mix sample and reagent fluid with a degree of accuracy heretofore unattainable. In addition, the dispenser has a selfpurging feature which significantly reduces contamination and also reduces the volume of sample and reagent fluid required for each analysis.

According to another feature of the system, the analyzing means comprises apparatus for instantaneously determining the concentration of a predetermined substance that absorbs radiant energy within a predetermined band of wavelengths, even though the predetermined substance is in the presence of other intefering substances that absorb radiant energy in the region of the predetermined band. According to a principal feature of the apparatus, at least two different wavelengths of radiant energy are generated. For example, the first wavelength may lie substantially in the center of the predetermined band, and the second wavelength may lie substantially outside the predetermined band. Likewise, radiant energy may be generated at a first wavelength at which the absorption coefficients of the predetermined substance and an interfering substance are the same, and another wavelength at which the absorption coefficient of the substances are substantially identical. The wavelengths of radiant energy are then transmitted through the substances, preferably in sequence and along a single path. Moreover, the transmission of radiant energy is periodically interrupted by means which prevent the transmission of any radiation. This unique feature provides a reference level against which the transmitted radiation can be measured. The intensities of radiant energy transmitted through the substances at the first and second wavelengths are instantaneously compared by electronic apparatus. By properly comparing the intensities, the absorbence of radiant energy by the other interfering substances is instantaneously compensated for without physically separating these substances from the predetermined substance. Thus, the concentration of the predetermined substance may be determined with a degree of speed and accuracy heretofore unattainable, and may even be accurately evaluated while the predetermined substance is involved in a chemical reaction. Moreover, this unique system automatically corrects for scattering media in the substances because radiation is scattered equally for all wavelengths by such media.

According to another preferred feature of the apparatus, three wavelengths of radiant energy are generated. The first wavelength lies substantially in the center of the predetermined band; the second wavelength is greater than the first wavelength and lies substantially outside the predetermined band; and the third wavelength is less than the first wavelength and lies substantially outside the predetermined band. The radiant energy at the three wavelengths is then sequentially transmitted through the substances along a single path and is compared as described previously. According to this feature, the transmission of radiant energy is also interrupted periodically in order to establish a reference level. By using the foregoing apparatus, the concentration of the predetermined substance is determined instantaneously with a degree of accuracy heretofore unattainable.

By using the above-described system, applicant has been able to completely eliminate many mechanical parts required in prior art systems, thereby increasing the accuracy and reliability of the analysis results. Moreover, the rates of reactions of multiple specimens may be determined during the same period of time. This feature offers a substantial advantage over prior art systems in which the reaction of each specimen must be analyzed before the next succeeding specimen can be evaluated. In addition, applicant has found that his unique system enables end point determinations to proceed before the endpoint of the reaction has been reached. Various features of the system also drastically reduce the volume of the specimens required for accurate analysis and ensure the purity of the specimens. In addition, applicant's unique analyzing apparatus enables instantaneous correction for interferring substances found in each specimen, thereby enabling specimens to be analyzed with a degree of accuracy heretofore unattainable.

DESCRIPTION OF THE DRAWINGS

These and other advantages and features of the present invention will hereinafter appear for purposes of illustration, but not of limitation, in connection with the accompanying drawings, in which like numbers refer to like parts throughout, and in which:

FIG. 2 is a top plan view of a preferred form of cuvette assembly made in accordance with the present invention;

FIG. 3 is a cross-sectional view taken along line 3—3 of FIG. 2;

FIG. 4 is a side elevational view of the cuvette assembly shown in FIG. 2;

FIG. 5 is a cross-sectional, fragmentary, partially schematic view showing the cuvette assembly, carrousel assembly, cycling apparatus, positioning apparatus, and a portion of the analyzing apparatus of the preferred embodiment;

FIG. 6 is a front elevational view of a preferred form of position encoding apparatus made in accordance with the present invention;

FIG. 7 is a fragmentary, partially cross-sectional side elevational view of a preferred form of carrousel advance apparatus made in accordance with the present invention;

FIG. 8 is a front elevational view of a preferred form of a dispenser assembly made in accordance with the present invention, with the hood and cabinet thereof removed, the probe holding assembly of the dispenser assembly being positioned over a test tube of the carrousel assembly;

FIG. 9 is a top plan view of the apparatus shown in FIG. 8 in which the probe holding assembly is positioned over the cuvette assembly;

FIG. 10 is a side elevational view of a preferred form of a probe assembly used in connection with the dispenser assembly;

FIG. 11 is an enlarged, side elevational view of a preferred form of a probe nozzle used in connection with the probe assembly;

FIG. 12 is an enlarged, top plan view of a valve and a microsyringe shown in FIG. 8;

FIG. 13 is an enlarged, fragmentary, cross-sectional view of the like-numbered encircled portion of FIG. 12;

FIG. 14 is an enlarged schematic diagram of the syringes and valve shown in FIG. 8 during a discharge mode of operation;

FIG. 15 is an enlarged, fragmentary, schematic diagram of the valve shown in FIG. 14 during a charge mode of operation;

FIG. 19 illustrates certain signal waveforms produced by the circuit shown in FIG. 18;

FIG. 23 is a schematic block diagram of a preferred system made in accordance with the present invention;

FIGS. 30–35 are schematic diagrams illustrating a preferred form of a portion of a processing circuit used in connection with the present invention;

FIGS. 35a and 35b illustrate the manner in which FIGS. 24–35 may be arranged for a better understanding of the interconnections between the circuits; and FIGS. 36–38 are schematic digrams illustrating the timing signals produced by certain portions of the processing circuit during various modes of operation.

DESCRIPTION OF THE PREFERRED EMBODIMENT

Figure 1:
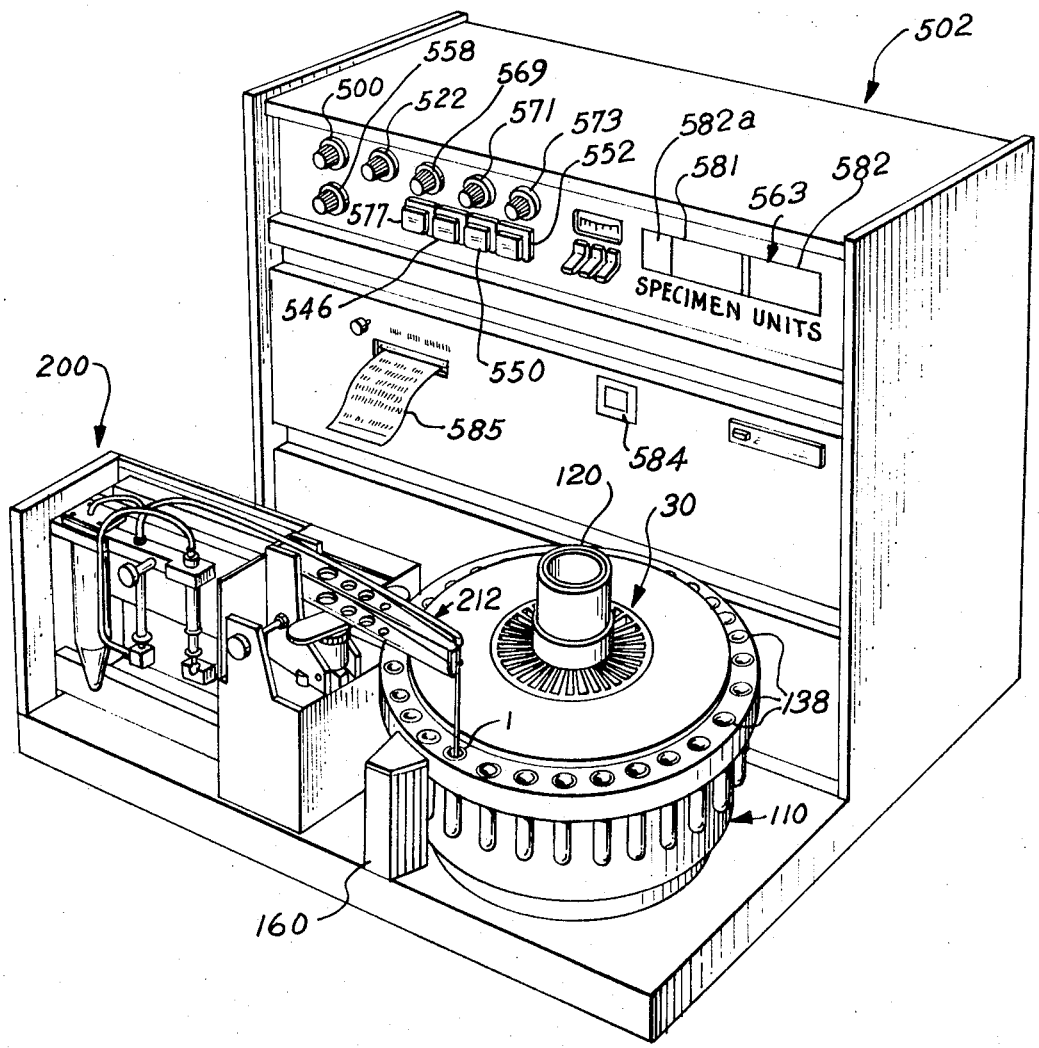
FIG. 1 is a perspective view of a preferred form of apparatus made in accordance with the present invention.

Referring to the drawings, a preferred system for analyzing chemical specimens made in accordance with the present invention basically comprises a cuvette assembly 30; a carrousel assembly 110, including a cycling assembly 168; a dispenser assembly 200; analyzing apparatus 400; a console 506; a processing circuit 540; and a memory 562.

Cuvette Assembly

Referring to FIGS. 1–4, cuvette assembly 30 provides 32 compartments in which 32 separate chemical specimens may be mixed and held for analysis. The assembly is integrally formed from an acrylic plastic material that transmits ultraviolet light, such as Rohm and Haas Plexiglas V(811)–100UVT. Applicant has found that this material offers a number of advantages. It is relatively inexpensive, and therefore enables the cuvette to be disposed of after use. In addition, the described acrylic plastic offers excellent optical properties for the transmission of ultraviolet light which are not provided by many other acrylic plastics.

Referring to FIGS. 2–4, cuvette assembly 30 comprises a slanting, inner sidewall 32 having an inner surface 34 and an outer surface 36. Cuvette assembly 30 also comprises a slanting, outer sidewall 40 having an inner surface 42 and an outer surface 44. Sidewalls 32 and 40 are each slanted at an angle of 15° from a vertical plane. Applicant has found that this is the minimum angle required to prevent specimen fluid from splashing out of the cuvette as it is being discharged therein.

Another portion of cuvette assembly 30 comprises a cylindrical collar 50 having an upper edge 52, a lower edge 54, and a central axis 56. Collar 50 defines a ventilating opening 55 that allows the passage of air.

Assembly 30 further comprises a positioning lip 92 attached to outer sidewall 40 in the manner shown. Lip 92 has notches, such as notches 94, 96 that are equally spaced between each other and are located along a center line radius of a compartment.

Spacers 58 are integrally formed with the sidewalls in a fluid-tight manner to form 32 separate compartments 60–91. The compartments lie along a line defining a circle. The lower portion of each spacer is split into two sections 57, 59 that separate each of the compartments by an air space 53. This feature enables several cuvettes to nest on top of each other, thereby reducing the space required for storage. In addition, this air space allows the fluid of an incubating device to separately flow around each compartment, thereby reducing the time required to bring the specimens up to temperature. This feature will be described in more detail later. Each of the compartments is adapted to hold a specimen to be analyzed. The lower portion of each compartment is fitted with a bottomwall that is integrally formed with the adjacent spacers and sidewalls in a fluid-tight manner. Exemplary bottomwalls 48 have curved upper surfaces 49 that cause fluid ejected into the compartments to engage in a swirling motion that aids mixing.

Each of the compartments 60–91 is identical and may be understood from exemplary compartments 67 and 83 shown in FIG. 3. Compartment 67 comprises the sidewalls and bottomwalls described previously. In addition, compartment 67 comprises flat, planar portions 98 and 100 that form a window section 38. Likewise, compartment 83 comprises the sidewall and bottomwall described previously. In addition, it comprises flat planar portions 102 and 104 that form a window section 46. It should be noted that portions 98, 100 are opposed planar members that are parallel to each other. Likewise, portions 102, 104 are also opposed planar members that are parallel to each other and to portions 98, 100. As can be seen in FIGS. 2–4, the flat planar portions forming the window sections lie in a common plane and are integrally formed with the bottomwall and sidewalls. It should be noted that sidewalls 32 and 40 are each 0.040 inches thick, and that the distance between planar portions 98, 100 and the distance between planar portions 102, 104 is in each case exactly 1 centimeter.

As will be described in more detail later, this arrangement of window sections provides an accurate pathlength for a radiant energy analyzing beam not found in the test tube cuvettes employed in some systems. Moreover, since the entire cuvette assembly is made from a relatively inexpensive plastic, it may be disposed of after a single use so as to prevent contamination from previous use or improper washing. The disposability of the cuvette is very important, since it eliminates the necessity of using large volumes of reagent to wash the previous sample from a flow-through cuvette. By using the cuvette assembly described herein, the same compartment is used as a reaction chamber and radiant energy analyzing chamber, thereby achieving economy of operation and a more compact system than would be otherwise possible.

Carrousel Assembly

Referring to FIGS. 1 and 5–7, carrousel assembly 110 comprises a cylindrical base member 112 that supports platforms 114, 115. Platform 114 carries cylindrical support column 116 through which air is circulated by a fan 118 for cooling purposes. A cylindrical outer column 120 is carried by the top of column 116.

An incubator assembly 122 comprises a generally toroidal bath chamber 124 which is formed by a hollow receptacle 125 comprising a cylindrical inner wall 126 and a cylindrical outer wall 128. Wall 126 is integrally formed with column 120. Walls 126 and 128 are fabricated from a good thermal conducting material such as aluminum or copper. Windows that readily pass radiant energy in order to accommodate analyzing apparatus described hereafter are located in walls 126 and 128.

Bath chamber 124 is filled with water to level A shown in FIG. 5. The water is heated to a predetermined temperature by a heater element 129, and the heater element is controlled by a thermistor 131 and a manually adjustable control switch (not shown). As shown in FIG. 5, the incubator is used in order to maintain the specimens held in the cuvette compartments at a predetermined temperature. As previously described, the cuvette compartments are separated so that the water of incubator assembly 122 freely flows adjacent each specimen. Applicant has found that this arrangement brings the specimens up to temperature faster and holds the specimens at a more uniform temperature than has heretofore been possible.

Still referring to FIGS. 1 and 5, assembly 110 is provided with a movable positioning platform 130 comprising a cylindrical skirt 132 and a ring-shaped test tube retainer 134. The retainer comprises a horizontal ring member 136 that is provided with holes for receiving 32 test tubes commonly designated by the number 138, and including exemplary test tubes 140, 141. Each of the test tubes lies along a radius common to a corresponding cuvette compartment. The retainer also comprises a vertical ring-shaped retainer 142. According to the preferred embodiment of the invention, the test tubes are used to hold chemical samples prior to the time they are mixed with a suitable reagent to form a specimen for analysis. The tubes are biased against retainer 142 by resilient spring clips, such as exemplary clips 143, 144. The clips are mounted on skirt 132.

Positioning platform 130 also comprises a raised, ring-shaped portion 146 that carries on its underside a circular positioning member 148 bearing detents. Member 148 is provided with one detent opposite each test tube and corresponding cuvette compartment, so that each specimen may be accurately located in a predetermined analyzing position during the analysis procedure. The entire positioning platform is rotatably mounted on platform 115 by means not shown. The inner edges of platform 130 are fitted with guides, such as guides 149, 150, that comate with the notches of lip 92 of cuvette assembly 30. By using the guides, the cuvette assembly is precisely located on the platform and is rotatable therewith.

Cylindrical skirt 132 comprises 32 sets of five coded holes that are drilled adjacent a radial line extending from each cuvette compartment. An exemplary set 152 of such coded holes are shown in FIG. 6. Referring again to FIG. 5, light is transmitted through the coded holes to a plurality of stationary phototransistors 154 by a light pipe 156. As explained in more detail later, the coded holes are used to generate a binary identity code that uniquely identifies each test tube and corresponding cuvette compartments that is moved into the analyzing position. That is, each of the test tubes and corresponding cuvette compartments is identified by a different arrangement of coded holes which can be recognized and used to perform certain machine functions. The manner in which cells 154 are arranged in order to recognize the hole binary code is well-known to those skilled in the art.

As shown in FIG. 5, a test tube detection assembly 158 is held in a cabinet 160 that is located one position ahead of the analyzing position. The assembly comprises a pendulum 162 pivoted around a rod 164. The pendulum normally swings into the path of test tubes 138, and in that position, causes a mercury swtich 166 to be closed. When a test tube is positioned opposite assembly 158, pendulum 162 is moved to the position shown in FIG. 5, thereby causing switch 166 to open. Assembly 158 operates in a manner described hereafter so that the normal operation of the system is interrupted if no test tube is present at a particular position in ring member 136.

Carrousel assembly 200 also comprises a cycling assembly 168 shown in FIG. 7. Assembly 168 comprises a solenoid 170 that operates an actuator arm 172 comprising an upper arm 171 and a lower arm 173 that pivot about a bearing 174. Assembly 168 also comprises a metallic bellows 176 that is normally filled with oil. A flexible hat-section 177 is located above the bellows and is connected thereto by a flapper valve 178 that controls the movement of oil. A spring 180 mounted on actuator arm 172 biases a roller art 182 in an upward direction (as shown in FIG. 7). A roller 184 is rotatably mounted at the outer end of roller arm 182 and is biased into contact with the detents or positioning member 148, such as exemplary detents 185, 186. As previously described, positioning member 148 is rigidly attached to positioning platform 130 on which cuvette 30 is carried. The biasing action of spring 180 ensures the precise positioning of the positioning platform at all times.

The cycling assembly operates as follows. When solenoid 170 is activated, it forces upper arm 171 to the right (as shown in FIG. 7), and forces lower arm 173 upward, thereby compressing bellows 176 in an upward direction. This force is resisted by the bellows which is filled with oil. In order to relieve the oil pressure, flapper valve 178 opens, thereby permitting oil from the bellows to flow freely into flexible hat-section 177. As upper arm 171 is moved to the right, roller 184 is removed from detent 185 and is repositioned in detent 186. The foregoing motion of the actuator arm is extremely rapid, so that the carrousel positioning platform 130 temporarily remains in a stationary position. At the completion of the solenoid stroke, the actuator arm reaches the position shown in phantom in FIG. 7. At this time, the solenoid is de-energized, and the resiliency of the metallic bellows biases the actuator arm toward its original position. The return of the actuator arm to its original position is damped by the closing of flapper valve 178. The flapper valve is provided with a hole therein so that the oil can leak into the metallic bellows at a predetermined rate, thereby providing a smooth, steady return motion to the actuator arm. As a result, when the actuator arm is returned to its initial position, detent 186 is moved to the position formerly occupied by detent 185, so that positioning platform 130 is advanced one position. As the positioning platform is advanced, the cuvette compartments are also advanced one position.

A stop lever 188 having a threaded adjustment screw 189 is used to adjust the normal position of the actuator arm so that the positioning platform will support the cuvette assembly in an exact, predetermined position after every solenoid stroke. As will be described in detail later, the cycling assembly is used to sequentially advance the cuvette compartments into the path of an analyzing beam.

Dispenser Assembly

Referring to FIGS. 8 and 9, dispenser assembly 200 comprises a frame 202 that includes a base member 203 and mounting plates 206, 207, and 208.

The dispenser assembly also comprises a probe holding assembly 212 that includes vertical support members 214 and 216. The vertical support members are positioned by an upper arm 218 that is rotatably mounted by pins 220, 221. Likewise, the vertical support members are positioned by a lower arm 222 that is rotatably mounted by pins 224, 225. A tube 226 is used to convey fluid to a probe assembly 260 that is mounted on support member 216.

Dispenser assembly 200 also comprises a vertical positioning assembly 230 that includes an up-down solenoid 232 which operates a push rod 233 having an upper end 234 along its longitudinal axis. Push rod 233 is rigidly connected to a piston 235 that operates in a cylinder 236. The piston is normally biased in an upward direction by a helical bias spring 237 that is held within the cylinder below the piston. As a result, the probe holding assembly is normally positioned in the position shown in solid lines in FIG. 8. (i.e., in the "up" position). Cylinder 236 is rotatably mounted on plate 206 through a lower bearing 238 and is rotatably mounted on plate 207 through an upper bearing 239. Adjustable stop members 240 and 241 cooperate with a bar 242 mounted on the probe holding assembly in order to determine the lowermost position of the probe assembly when it is positioned over the test tubes and cuvette, respectively.

Dispenser assembly 200 also comprises a horizontal positioning assembly 244 that includes a spiral spring 246 having one end connected to plate 207 and the other end connected to cylinder 236. This spring normally biases the probe holding assembly in the position shown in phantom in FIG. 9 (i.e., in the "test tube" position).

Adjustable stops 248 and 249 are used to control the position of the probe holsing assembly when it is positioned over the test tubes and the cuvette assembly, respectively. Assembly 244 further comprises a rotation solenoid 250 that operates a push rod 252 along its longitudinal axis. Push rod 252 is connected through pins 255, 256 and arm 257 to a fixture 254 that, in turn, is rigidly affixed to one side of cylinder 236.

Referring to FIGS. 10 and 11, the dispenser assembly also comprises a probe assembly 260. The probe assembly comprises a stainless steel nozzle 262 that includes a front barrel 263, a rear barrel 264, and an end point 261. The front barrel has an inside diameter of 0.015 inches and an outside diameter of 0.020 inches. The rear barrel has an inside diameter of 0.015 inches and an outside diameter of 0.032 inches. The total length of the nozzle is 0.39 inches. As shown in FIG. 10, the nozzle is fitted into a tube 266 so that the rear barrel is completely enclosed by the tube. A solder rod 267 is placed over tube 266 in the location shown in order to precisely locate tube 266 in corresponding notch in support arm 216. Tube 266 is terminated in a beveled portion 268 that comates with tube 226 in the manner shown in FIG. 8.

Applicant has discovered that the dimensions of the nozzle are critical for the efficient and accurate dispensing or organic liquids, such as blood serum. More specifically, applicant has discovered that the inside diameter of the nozzle should be between 0.010 inch and 0.020 inch. If the nozzle diameter is substantially less than 0.010 inch, the nozzle tends to clog with any foreign matter that is located in the system. If the inside diameter of the nozzle is substantially greater than 0.020 inch, two problems occur:

1. The velocity of the discharge is not sufficient to cause adequate stirring or mixing of the reagent fluid and blood serum.

2. The meniscus of the fluid at the end point of the nozzle becomes difficult to control. For example, the lower portion of the meniscus might break off, thereby decreasing the accuracy of the amount of fluid transferred.

The outside diameter of the nozzle should be made as small as possible consistent with an appropriate degree of structural strength, thereby reducing the area of the nozzle wetted by the blood serum and holding carry over to a minimum.

The dispenser assembly also comprises a mixing assembly 270. Referring to FIGS. 8 and 12–15, the mixing assembly comprises a reagent reservoir 272 that holds a reagent fluid which is mixed with samples held in test tubes 138 in order to prepare specimens for the various cuvette compartments. The reagent reservoir comprises a dip tube 273, a cover 274, and a transfer tube 275 that is connected with the dip tube.

Referring to FIGS. 12–14, the mixing assembly also comprises a microsyringe 280 having a capacity of 50 microliters. The microsyringe has a glass barrel 281 and a stainless steel tip 282 that define an outer cylinder 283. A hollow plunger 284 defining an inner cylinder 285 is arranged to slide within the outer cylinder 283. Cylinders 283 and 285 together define a cavity 286 having an inlet orifice 287 located at the end of tip 282 and an outlet orifice 288 located at the end of plunger 284. Tip 282 is connected to tube 226, which, together with probe assembly 260 defines a passageway to the probe nozzle tip 261.

Referring to FIG. 14, the mixing assembly also comprises a macrosyringe 290 having a capacity of 2,500 microliters. The macrosyringe comprises a stainless steel tip 292 that is fitted into a glass barrel 291 which defines a cylinder 293. A solid glass plunger 294 is adapted to slide within cylinder 293. Cylinder 293 defines a cavity 295 having an inlet orifice 296 at the end of tip 292 that is connected to a tube 298.

Figure 25:
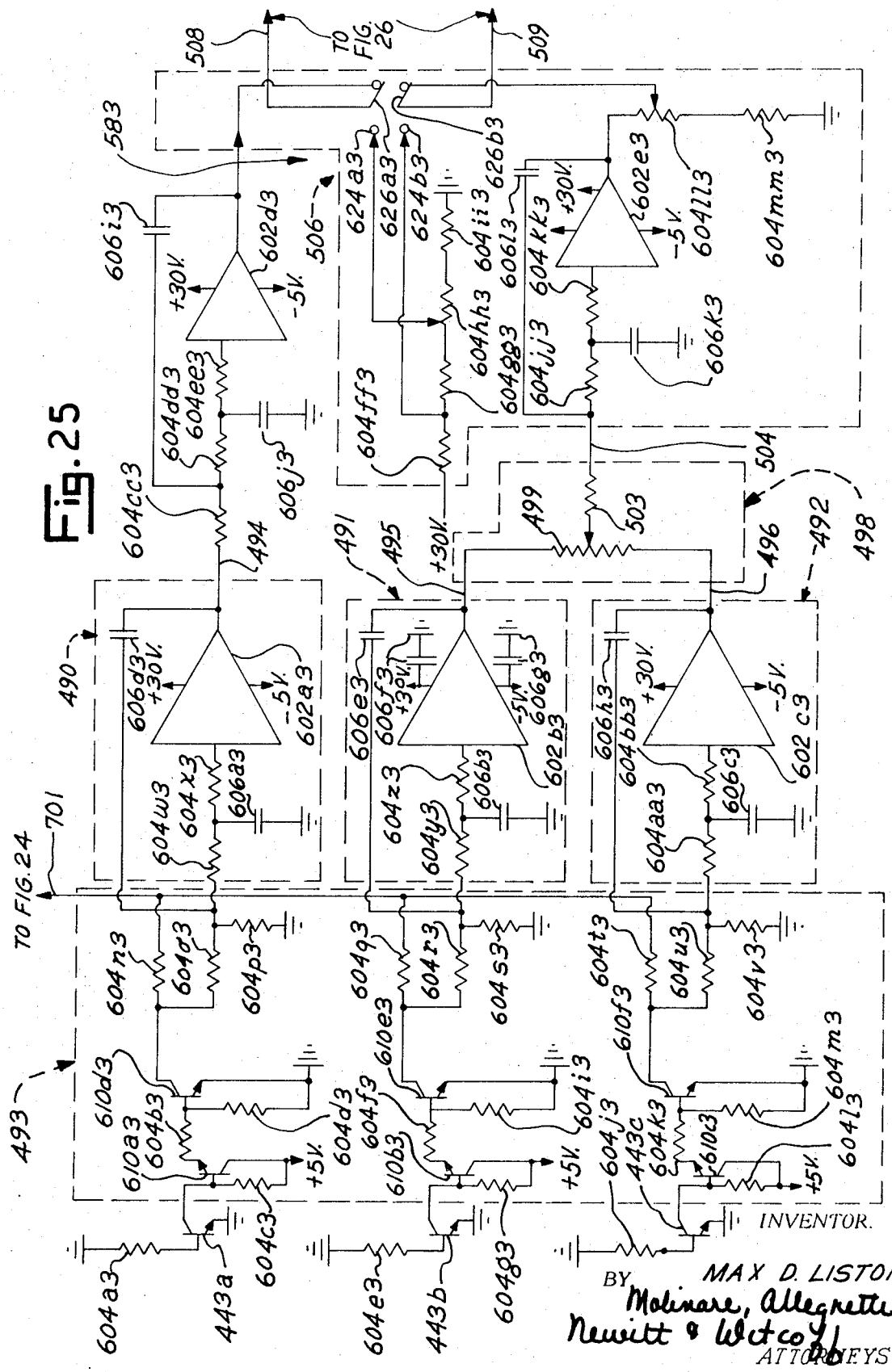
FIG. 25 is a schematic diagram illustrating a preferred form of detection circuit, filter, and summing circuit used in connection with the analyzing apparatus.
Figure 26:
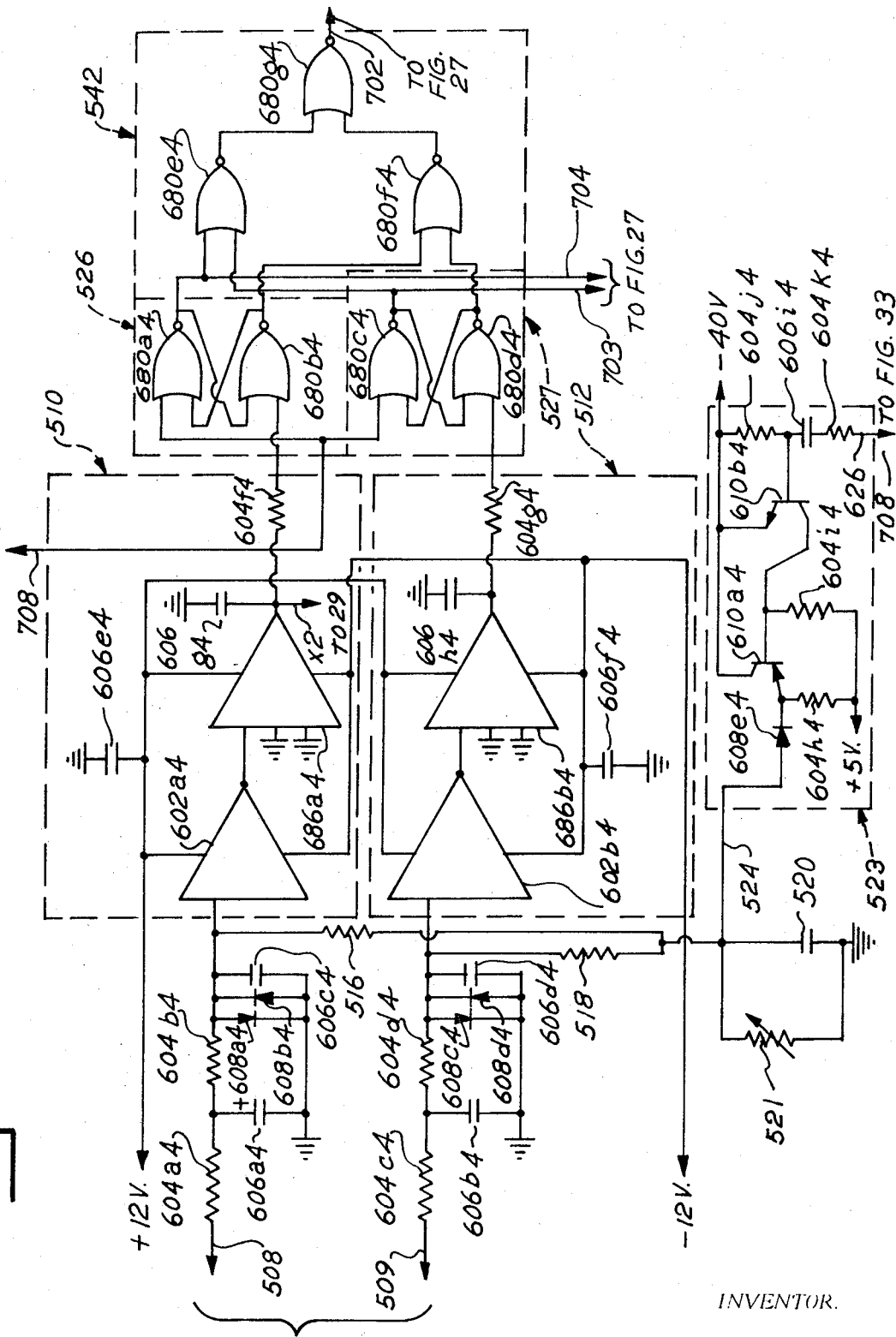
FIG. 26 is a schematic diagram illustrating a preferred form of comparator and gate apparatus used in connection with the analyzing apparatus.

Referring to FIGS. 14 and 25, the microsyringe and the macrosyringe are connected to a three-way valve 300 that comprises a case 301 and a valve element 302. The valve element defines channels 303, 304 that may be interconnected to various inlets 305, 306 and 307. Plunger 284 has its outlet orifice 288 rigidly connected to inlet 306 of valve 300. As shown in FIG. 14, when the valve is in its "discharge" position, it forms a passageway, together with tube 298, that extends from outlet orifice 288 of microsyringe 280 to the inlet orifice 296 of macrosyringe 290. As shown in FIG. 15, when the valve is in its "charge" position, tube 275, together with the valve and tube 298, form a passageway that extends from the reagent reservoir 272 to inlet orifice 296.

Referring to FIGS. 8, 16, 16a, 16b, and 17, the dispenser assembly also comprises an operating assembly 310. The operating assembly comprises a horizontal support bar 314 that rigidly connects barrels 281 and 291 of syringes 280 and 290, respectively to the frame.

Another horizontal support bar 315 connects reservoir 272 to the frame. Assembly 310 also includes a removable plate 311 that is connected to valve 300 and to plunger 294 of macrosyringe 290 through a fixture 326. Plate 311 is connected to a carriage 312 by means of screws (not shown). By merely removing these screws, the entire plate assembly shown in FIG. 16a may be removed. This is an important feature since it facilitates the changing of the microsyringe, macrosyringe, and reservoir in order to run different determinations. By removing one plate assembly and substituting another, the apparatus may be changed to accomodate a different determination in a matter of seconds. Plate 311 carries a stop member 313 that may be adjusted by mounting it opposite various multiple holes 313a in plate 311. Member 313 controls the lower position of plate 311 by engaging a microswitch 363a that is attached to the frame through a bracket 319. Plate 311 also carries another stop member 321 that engages another microswitch 363b which controls the upper position of plate 311. carriage 312 is adapted to move along a vertical shaft 316 that is connected between base plate 203 and horizontal plate 317. The carriage is coupled to shaft 316 through linear bearings 318, 320 that are adapted to slide in a vertical direction along the shaft. The carriage is driven by a rack 322 that cooperates with a pinion gear described hereafter.

Figure 16:
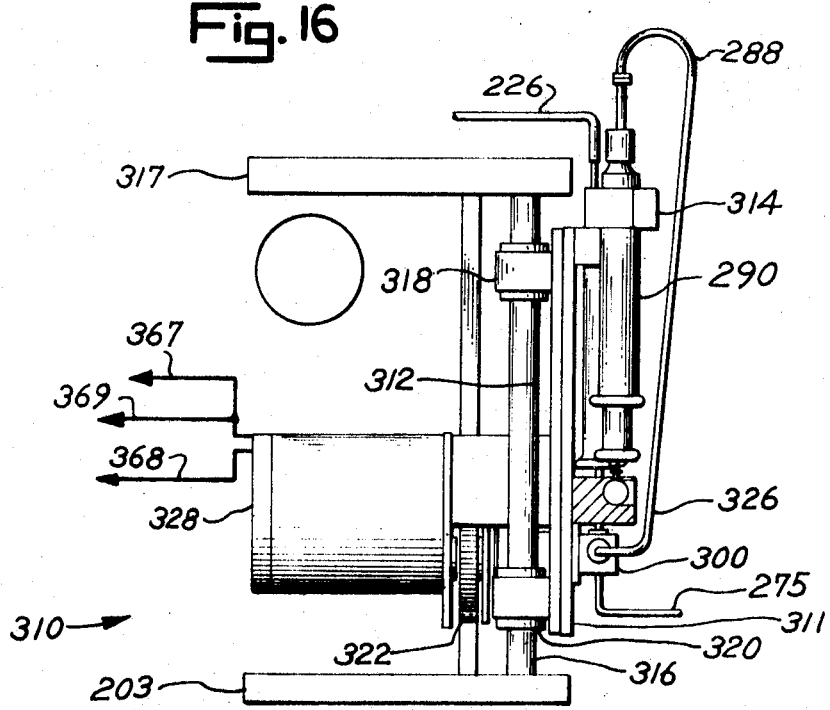
FIG. 16 is a fragmentary, side elevational view of a portion of the dispenser assembly shown in FIG. 8.
Figure 17:
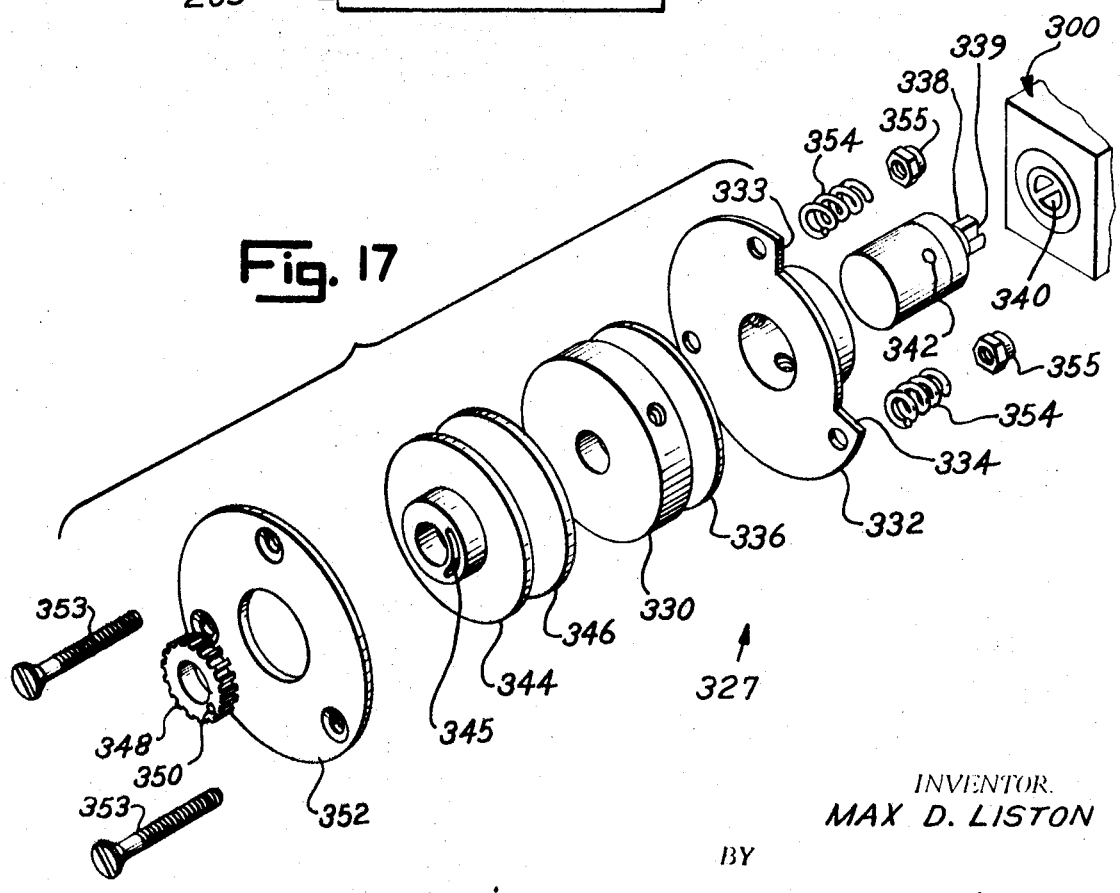
FIG. 17 is an enlarged, exploded view of a portion of the apparatus shown in FIG. 16.
Figure 16A:
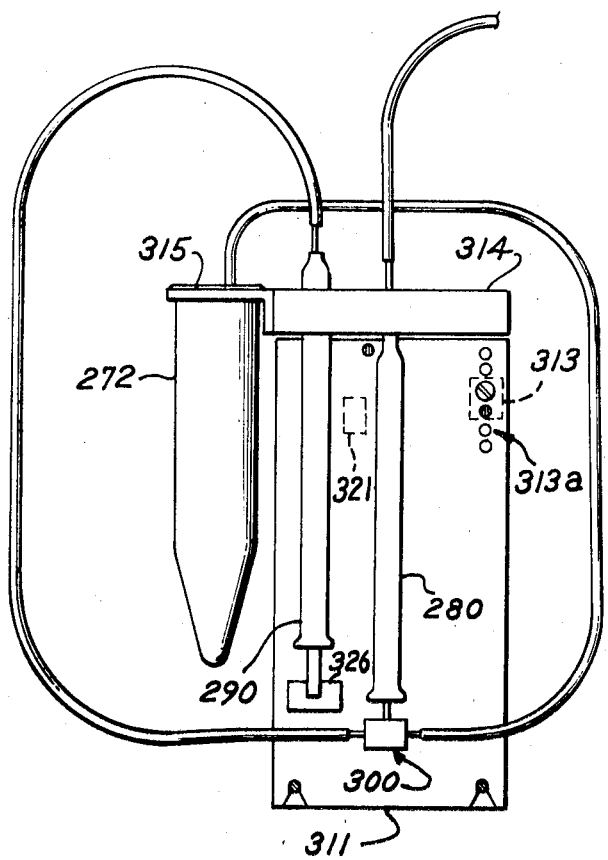
FIG. 16a is a front elevational view of the removable plate of the dispenser assembly, together with the apparatus connected thereto.
Figure 16B:
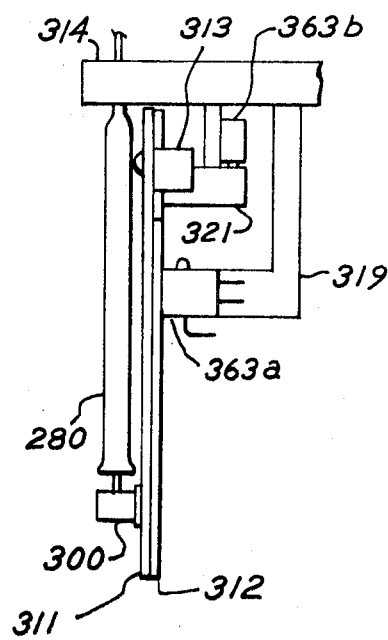
FIG. 16b is a fragmentary, side elevational view similar to FIG. 16 and showing additional apparatus used to operate the dispenser assembly.

Referring to FIGS. 16 and 17, the operating assembly further comprises a clutch assembly 327, that includes an electric motor 328 which has its rotor connected to a clutch plate 330 through a shaft (not shown). The clutch plate operates a valve drive plate 332 having stop facings 333, 334 through a low coefficient clutch facing 336. Drive plate 332 is pinned by means of a hole 342 to a shaft 338 having a slot 339. Stop facings 333, 334 cooperate with stop members connected to the frame which prevent shaft 338 from turning through more than 90° of arc. Slot 339 cooperates with a rib 340 of valve element 302 in order to move the valve element between the discharge and charge positions shown in FIGS. 14 and 15. The clutch plate also operates a pinion drive plate 344 having a slot 345 through a high coefficient clutch facing 346. A pinion gear 348 is connected to the drive plate through a pin (not shown) that fits through a hole 350 into slot 345. This arrangement allows the clutch plate to move through 90° of arc before the pinion gear is moved. The entire clutch assembly is held together by a retaining plate 352, screws 353, springs 354, and nuts 355.

Figure 18:
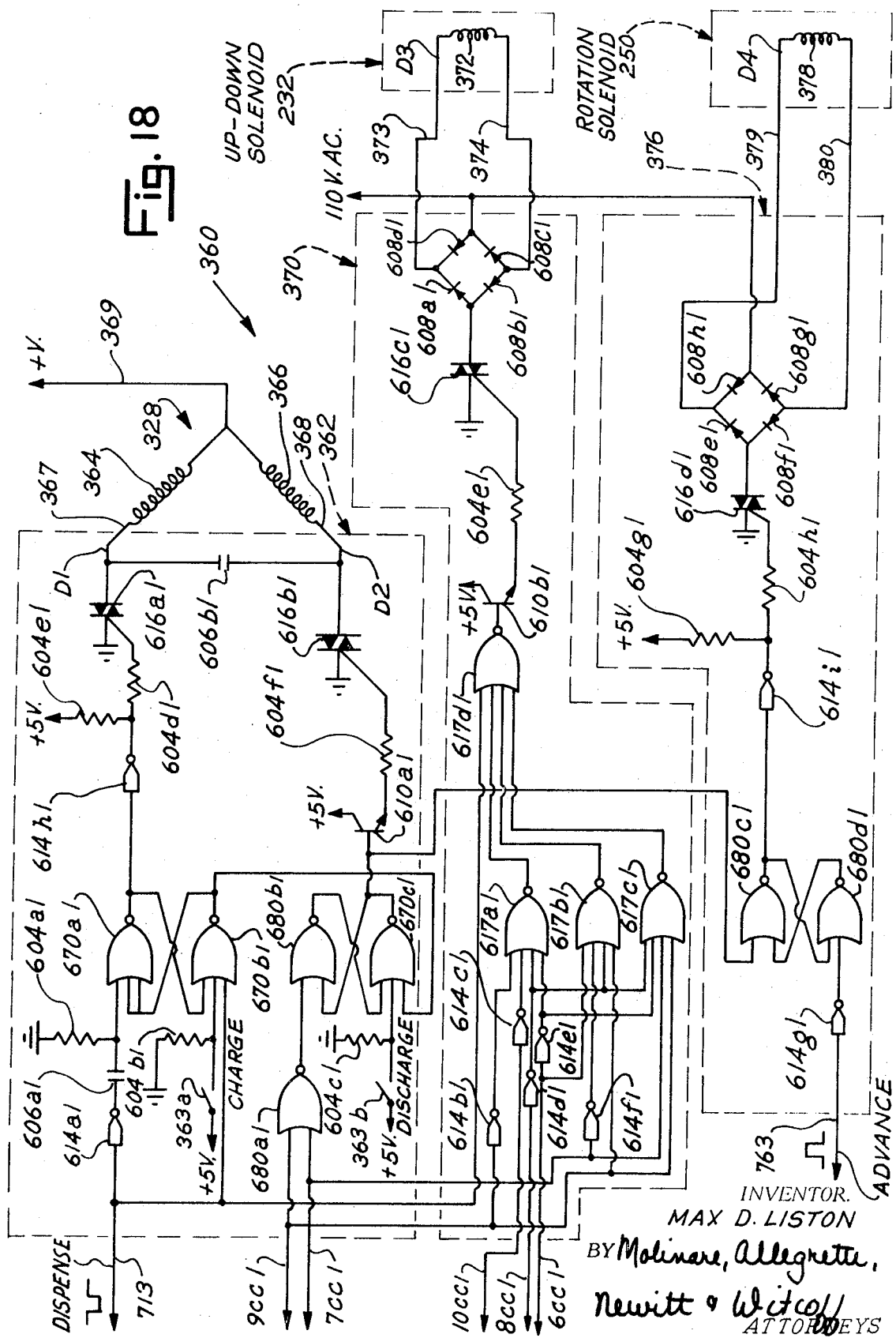
FIG. 18 is a schematic diagram of a preferred circuit used to control the dispenser assembly.
Figure 24:
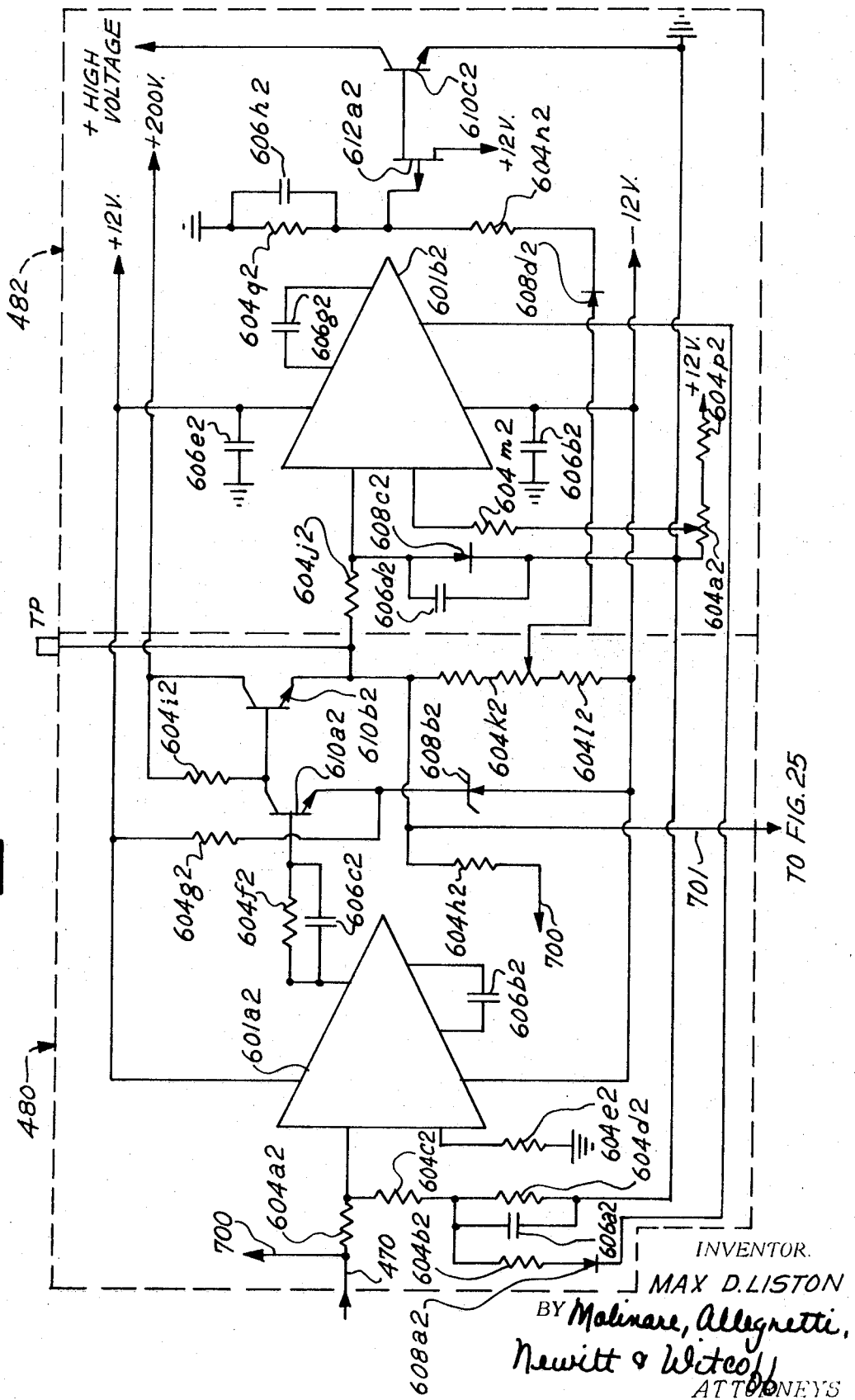
FIG. 24 is a schematic drawing of a preferred form of amplifier used in connection with the analyzing apparatus.

Referring to FIG. 18, the operating assembly also comprises a dispenser control circuit 360. The control circuit basically comprises a motor control circuit 362 having microswitches 363a and 363b that are mounted on the frame adjacent the carriage. Stop members 313 and 321 on the carriage engage the microswitches during the operation of the dispenser. The motor control circuit is used to control windings 364 and 366 that form a part of motor 328. The motor control circuit controls the windings by transmitting signals over conductors 365, 368 and 369.

The dispenser control circuit also comprises an up-down solenoid control circuit 370 that is used to control a winding 372 of up-down solenoid 232 by means of conductors 373, 374. The dispenser control circuit further comprises a rotation solenoid circuit 376 that is used to control a winding 378 of rotation solenoid 250 by means of conductors 379, 380.

Dispenser Assembly Operation

The operation of the dispenser assembly will now be described assuming that a test tube 140 and its corresponding cuvette compartment 83 are moved into the position shown in FIGS. 8 and 9. It is further assumed that test tube 140 holds an aqueous solution such as blood or the like, and that air has been removed from the mixing assembly.

As previously mentioned, springs 237 and 246 normally bias the probe holding assembly in its up position over the test tubes (i.e., the position shown in solid lines in FIG. 8 and in phantom in FIG. 9). Referring to FIGS. 18 and 19, operation of the dispenser assembly is commenced by the transmission of a negative pulse over the dispense line 713 to the motor control circuit 362. In response to this signal, the motor control circuit produces signal D1 across winding 364 of motor 328 in the manner shown in FIG. 19. In response to signal D1, motor 328 rotates clutch 330, valve drive plate 332, shaft 338, and rib 340 of valve element 302 through 90 degrees of arc so that the valve element is moved to the position shown in FIG. 15. As shown in FIG. 19, the rotation of valve element 302 requires approximately 1.16 seconds.

While valve element 302 is being rotated, up-down solenoid circuit 370 transmits signal D3 (FIG. 19) to winding 372 of up-down solenoid 232. Referring to FIG. 8, in response to the D3 signal, solenoid 232 rapidly lowers push rod 233, thereby lowering end point 261 of probe assembly 260 below the surface of the liquid held in test tube 140 to level F. In other words, the probe holding assembly 212 is lowered to the position shown in phantom in FIG. 8 (i.e., the "charge" position). By properly adjusting stop member 240, end point 261 is located not more than 2 millimeters below the surface of the liquid. Applicant has found that this is an important feature, since it reduces the amount of surface area of the probe nozzle which is in contact with the liquid.

After the probe assembly is in its charge position and after valve element 302 has rotated to the position shown in FIG. 15, the pin inserted in hole 350 of pinion gear 348 (FIG. 17) engages an end of slot 345, thereby causing the pinion gear to rotate. When the pinion gear rotates, it drives rack 322 and carriage 312 in a downward direction (FIG. 16). Since carriage 312 is attached to plunger 294 and valve 300, the plungers of the syringes are pulled away from the syringe barrels, thereby enlarging the cavities defined by the syringes. In this mode of operation, a small amount of fluid is drawn from test tube 140 through end point 261 of the probe assembly into nozzle 262. Normally, the amount of fluid is approximately 10 microliters. At the same time, reagent fluid is drawn from the reservoir 272 through tube 275, valve element 302, and tube 298 into the cylinder of syringe 290. In order to achieve the foregoing results, carriage 312 is moved downward approximately one-half inch in approximately 1.46 seconds. When carriage 312 moves downward far enough to engage microswitch 363a (FIG. 18) signal D1 is terminated and the carriage stops. If larger quantities of fluid are to be drawn into the probe assembly, carriage 312 may be moved downward an additional amount, by repositioning stop member 313. After carriage 312 has stopped in its lower position so that plungers 284, 294 have stopped moving, the operating assembly causes nozzle 262 to be retained in the fluid for at least 0.1 second. After the 0.1 second interval has passed, D3 is removed from winding 372 of the up-down solenoid 232 as shown in FIG. 19. At this time, spring 237 rapidly accelerates the probe nozzle away from the liquid in test tube 140 in an upward direction. This is an important feature, since the rapid upward acceleration causes the probe nozzle to break away from the liquid in test tube 140 without retaining a drop of liquid on the nozzle itself. The probe assembly continues to accelerate upward until it attains the position shown in solid lines in FIG. 8.

After the charged probe assembly is in its up position, rotation solenoid circuit 376 causes signal D4 (FIG. 19) to appear across winding 378 of rotation solenoid 250 (FIG. 18). In response to the signal, solenoid 250 drives push rod 252 toward itself (as shown in FIG. 9) thereby causing the probe holding assembly to move from the position shown in phantom in FIG. 9 to the position shown in solid lines.

At the same time the probe holding assembly is rotating toward the cuvette, motor control circuit 362 causes signal D2 (FIG. 19) to be transmitted through winding 366 of motor 328 (FIG. 18). In response to the signal, the direction of clutch plate 330 is reversed so that valve element 302 is returned to its original position shown in FIG. 14. This operation takes approximately 1.16 seconds.

While the valve element 302 is rotating to the position shown in FIG. 14, up-down solenoid control circuit 370 again impresses signal D3 across winding 372 of the up-down solenoid 232 (FIG. 18). In response to this signal, the end point 261 of the probe assembly is lowered into compartment 83 of the cuvette to level G (FIG. 5). Level G is calculated to be not more than 2 millimeters below the terminal level of liquid which will be in compartment 83 after the probe assembly is discharged. This terminal level is shown as level H in FIG. 5.

As previously explained, nozzle end point 261 may be lowered to exactly level G by adjusting stop member 241. This is an important feature, since experience has shown that a liquid bubble will be retained on the probe nozzle if the nozzle end point 261 is not extended slightly below the terminal liquid level. If the nozzle end point remains above this level, a bubble of fluid will be retained on the nozzle, thereby tending to contaminate the next specimen prepared. Likewise, if the nozzle end point extends too far below the terminal level, an excessively large area of the nozzle is wetted, so that an excessive amount of the specimen fluid is carried over to the next compartment.

After valve element 302 has rotated to the position shown in FIG. 14, the pin in hole 350 of the pinion gear 348 engages the opposite end of slot 345, thereby driving rack 322 and carriage 312 in an upward direction as shown in FIG. 16. As a result, plungers 284 and 294 are moved into barrels 281 and 291 of syringes 280 and 290, respectively. This movement reduces the size of the cavities defined by syringes 280 and 290 so that the sample fluid located in probe assembly 260 is expelled into cuvette compartment 83, and the reagent fluid held in cylinder 295 is expelled through tube 298, valve 300, plunger 284, cylinder 283 of microsyringe 280, tube 226, and probe assembly 260 into cuvette compartment 83. The carriage continues to move upward until microswitch 363b is operated by stop member 321, thereby terminating signal D2 and stopping the carriage. The foregoing method of discharge is an important feature, since the reagent fluid is passed through the microsyringe 280, tube 226, and the probe assembly after the fluid sample from the test tube has been expelled into the cuvette compartment. This operation purges these components of the sample fluid, thereby preparing the system to mix another sample with an additional quantity of the reagent fluid. In order to provide adequate purging, the amount of reagent fluid discharged through the probe assembly should be at least 10 times as great as the amount of sample fluid discharged. The proper ratio of reagent to sample fluid is provided by adjusting the relative sizes of the microsyringe and macrosyringe.

As previously described, the curved bottom and angled sidewalls of the cuvette cause the fluid discharged by the probe assembly to be mixed in each cuvette compartment by a swirling action. After the sample and reagent fluids are completely discharged, the resulting specimen in compartment 83 has risen to the level H (FIG. 5) which is 1 to 2 millimeters above the level of end point 261 of the probe nozzle. After carriage 312 has stopped in its upper position, the operating assembly causes nozzle end point 261 to be retained below level H for at least 0.1 second. After this time interval has pssed, the up-down solenoid control circuit 370 removes signal D3 from winding 372 of the up-down solenoid 232. In response to the removal of the signal, spring 327 rapidly accelerates the probe assembly upward and away from the specimen fluid in compartment 83. Thereafter, signal D4 is removed from winding 378 of the rotation solenoid 250. In response to the removal of the signal, spring 246 moves the probe holding assembly away from the cuvette to the position shown in phantom in FIG. 9 over the test tubes. At this point, the dispenser assembly is ready for another cycle of operation as soon as another test tube and cuvette compartment are moved into the dispensing position by the cycling assembly.

Analyzing Apparatus

Referring to FIGS. 5 and 20–22, analyzing apparatus 400 comprises generating apparatus including a light source 402 having a filament 404 that produces light throughout the visible and ultraviolet spectrum. The light source is held in a socket 401 by a spring 403 and an indexing plate 405. The light source supplies light to light pipe 156, to lenses 406, 407 that focus the light through a mirror 408 onto a ring-shaped filter 412 located on a disc 410, and to a commutator ring of disc 410. Disc 410 rotates about an axis 411 located in the center thereof.

Figure 20:
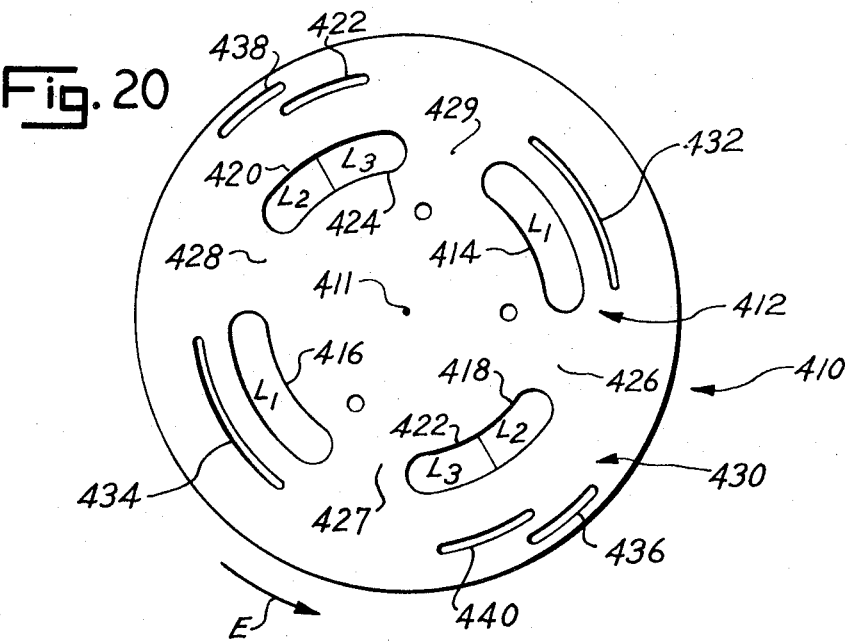
FIG. 20 is a top plan view of a preferred form of a light filter and commutator wheel used in connection with the analyzing apparatus.
Figure 21:
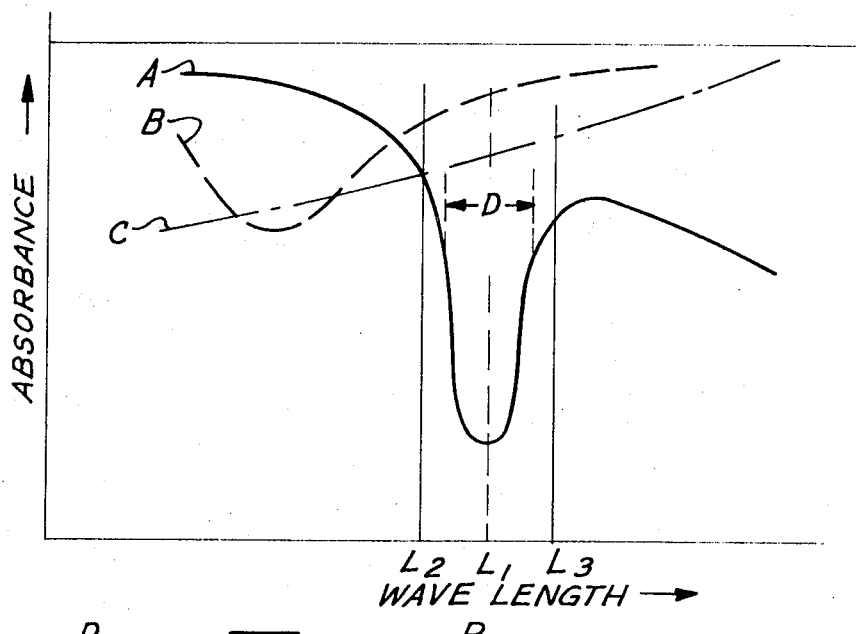
FIG. 21 is a graph showing the absorbence of radiant energy of various exemplary substances.

As best shown in FIG. 20, filter 412 comprises a pair of filter segments 414, 416 that are displaced from each other by 180° of arc. Segments 414, 416 are identical and transmit radiant energy only in the region of a particular wavelength L1. Filter 412 also comprises a pair of filter segments 418, 420 that are displaced from each other by 180° of arc. These filter segments are also identical and transmit radiant energy only in the region of another wavelength L2. Filter 412 further comprises a pair of filter segments 422, 424 that are displaced from each other by 180° of arc. Segments 422, 424 are identical and transmit radiant energy only in the region of a third wavelength L3. Those skilled in the art will recognize that the above-described filter segments would normally be expected to transmit radiant energy in a narrow band of frequencies in the region of wavelengths of L1–L3. However, for purposes of clarity, they will be discussed in this specification as if they transmitted radiant energy only at the precise wavelengths L1–L3. Filter 412 is designed so that the wavelengths of radiant energy passed by one pair of filter segments are not passed by the other pairs of filter segments. Filter 412 also comprises opaque segments 426–429 that prevents the transmission of light and establish a zero radiation reference level.

In order to properly employ filter 412, wavelengths L1–L3 must be chosen according to the radiant energy absorbence characteristics of the particular substance being analyzed. The manner of choosing these wavelengths for the filter is schematically described in FIG. 21, wherein curve A represents the absorbence characteristics of a substance being analyzed, and curves B and C represent the absorbence characteristics of other substances generally present in a specimen together with substance A.

Applicant has discovered that the difficulties normally encountered in the analysis of substance A due to the absorbence of substances B and C may be substantially eliminated by choosing wavelength L1 so that it lies substantially in the center of the absorbence band of substance A. Wavelength L2 is chosen so that it is less than L1 and lies substantially outside the absorbence band of substance A. Wavelength L3 is chosen so that it is greater than L1 and also lies substantially outside the absorbence band of substance A. Those skilled in the art will recognize that the absorbence band of substance A lies substantially in area D of FIG. 15.

Absorbence curves for most substances commonly analyzed are well-known, and can be obtained from the chemical literature. One skilled in the chemical arts can normally find the absorbence curve for the substance being analyzed, and can thereby determine the proper wavelengths L1–L3 with little difficulty. For example, if a chemist desires to make a total protein determination of a blood specimen, L1 would commonly be in the region of 545 nanometers, L2 would be approximately in the region of 500 nanometers, and L3 would be approximately in the region of 600 nanometers.

Applicant has also found that the use of multiple wavelengths of radiant energy reduces the effect of turbidity of a specimen, air bubbles entrained in the specimen, and optical imperfections of the cuvette.

In a bichromatic system, it is sometimes useful to choose L1 so that it lies at a wavelength at which the absorption coefficients of substances A and B are substantially different and to choose L2 so that it lies at a wavelength at which the absorption coefficients of substances A and B are substantially the same.

Figure 30:
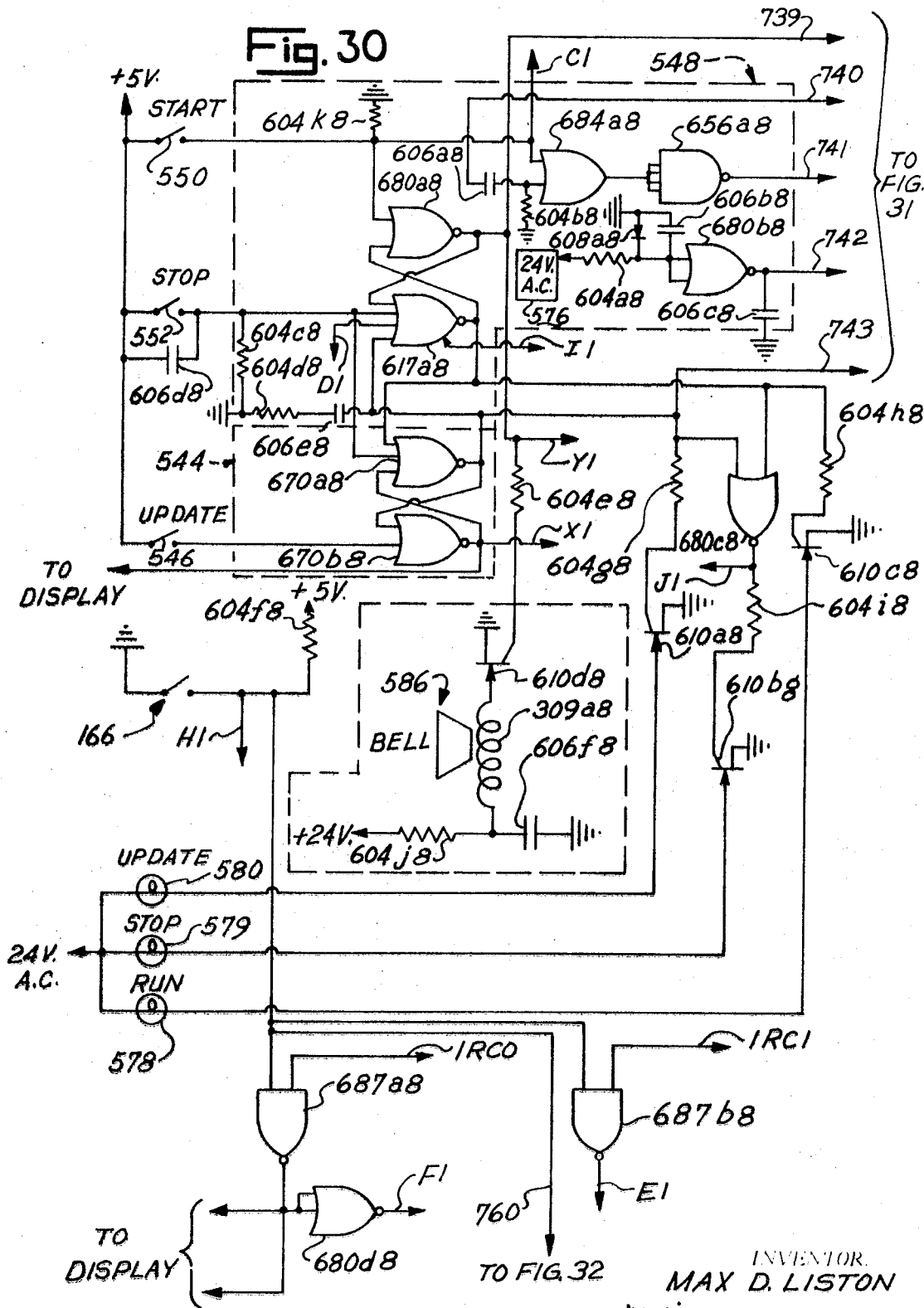

Returning to FIG. 20, disc 410 also comprises a commutation ring 430 that lies on disc 410 outside the region of filter 412. The commutation ring comprises a pair of slits 432, 434, that are opposite filter segments 414, 416 respectively, and which both lie on a common circle concentric with the axis 411. Commutation ring 430 also comprises a pair of slits 436, 438 that are located opposite filter segments 418, 420, respectively, and which lie on a common circle that is concentric with axis 411. Commutation ring 430 further comprises a pair of slits 440, 442 that are located opposite filter segments 422, 424, respectively, and which lie on a common circle that is concentric with axis 411. As shown in FIG. 30, each of the circles on which the slit pairs lie has a different radius, so that the slit pairs are radially displaced from each other Light from source 402 shines upward through the slit pairs into three photoelectric transistors that are aligned with the circles on which various slit pairs lie. That is, each of the photoelectric transistors receives light through the slits in each pair, but does not receive light from an adjoining slit. More specifically, as shown in FIG. 25, a photoelectric transistor 443a is positioned to receive illumination through slits 432, 434; a photoelectric transistor 443b is positioned to receive illumination through slits 436, 438; and a photoelectric transistor 443c is positioned to receive illumination through slits 440, 442.

Disc 410 is rotated in the direction of arrow E (FIG. 20) by a motor-gear unit 444 (FIG. 5) that rotates a shaft 446 through a magnetic coupling 448 and bearings 450, 452. Unit 444 is geared to rotate disc 410 at about 1,800 rpm.

Figure 22:
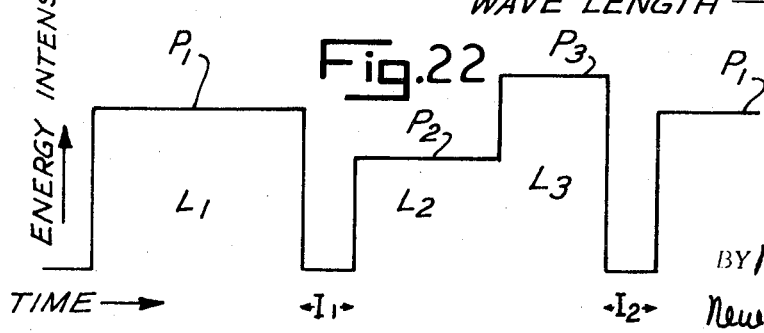
FIG. 22 illustrates the intensity of light transmitted by various sections of the filter shown in FIG. 20.

When filter 412 is being rotated, light from source 402 passes therethrough and generates beams of light along a single path 454. The beams of light comprise cyclical pulses of monochromatic light. A complete cycle of light pulses is shown in FIG. 22 as pulses P1, P2 and P3. It should be noted that pulse P1 is separated from pulse P2 by an interval I1 which is formed by segment 426 or 428 of the filter. Likewise, pulse P3 is separated from pulse P1 in each cycle by an interval I2 that is formed by segment 427 or 429 of the filter.

The monochromatic light pulses generated by the filter and source 402 in a single path pass through each specimen to be analyzed. For example, if compartment 83 of cuvette 30 is located in the analyzing position shown in FIG. 5, the pulses are passed through a lens 456, reflected from a mirror 457, and transmitted through the incubator bath chamber 124. The pulses thereafter pass through planar portion 98 of cuvette 30, the the specimen in compartment 83, planar portion 100, bath chamber 124, a mirror 458, and another lens 460 that focuses the resulting transmitted pulses onto a portion of filter 412 that is 180° displaced from the portion of the filter which produces the pulses. Since corresponding identical segments of the filter are displaced by 180° of arc, each pulse is filtered by identical filters before it enters the specimen and after it leaves the specimen. This arrangement provides a means for correcting the radiation transmitted through the specimen. For example, each photon of light passing through segment 414 also passes through corresponding segment 416. As a result, aberrant wavelengths of light which may have been picked up during the travel of the pulses through the specimen are removed, thereby avoiding one possible source of error in the analysis of the specimen. As stated in my U. S. Pat. No. 3,512,889, filtering a light beam both before and after it is transmitted through the specimen enables the system to be used in ambient light conditions.

After the pulses transmitted from the specimen pass through filter 412, they are transmitted into a photomultiplier transducer tube 462 the sequentially produces electrical pulse signals having values proportional to the intensity of the light transmitted through the specimen at each of wavelengths L1-L3. That is, tube 462 produces on its output conductor 470, electrical pulse signals having voltage waveforms corresponding to pulses P1-P3 in each cycle.

Electronic apparatus for analyzing the electric pulse signals produced by photomultiplier 462, together with additional processing circuits for controlling the operation of the entire system, are schematically shown in FIG. 23, More specifically, the pulse signals generated on conductor 470 are amplified by a signal amplifier 480 that is controlled by a bias amplifier 482. The output of signal amplifier 480 is also connected to one input of a servoamplifier 484. Another input to the servoamplifier is provided by a reference voltage supply 486. Servoamplifier 484 compares the signals from the amplifier 480 and the reference voltage supply in order to control the output of a servo-high voltage supply 488 that is connected to photomultiplier 462. If the signals produced on the output of amplifier 480 become sufficiently weak, high voltage supply 488 is altered so that photomuliplier 462 increases the magnitude of the signals appearing on conductor 470.

The output of amplifier 480 is also conducted to a comparison circuit 489 comprising low pass filters 490-492. The inputs of these filters are connected through a detection circuit 493 to photo transistors 443a-443c. The detection circuit receives information signals from transistors 443a-443c so that filters 490-492 are enabled to pass electric pulse signals corresponding to only one of light pulses P1-P3. More specifically, detection circuit 493 enables filter 490 to conduct a pulse signal to conductor 494 only during the duration of light pulse P1. Likewise, filters 491 and 492 are enabled to conduct pulse signals to conductors 495 and 496 only during the duration of light pulses P2 and P3 respectively. As a result, D.C. signals are produced on conductors 494-496 having magnitudes proportional to the intensity of light pulses P1-P3, respectively. The D.C. signals on conductors 495 and 496 are transmitted to a summing circuit 498 comprising an adjustable potentiometer 499 that is controlled by a knob 500 located on console 502 (FIG. 1). Circuit 498 also comprises a biasing resistor 503 through which a predetermined proportion of the summed values of the signals on conductors 495, 496 is transmitted to a conductor 504. Conductors 494 and 504 are connected through an adjustment circuit 506 to conductors 508, 509, respectively.

The D.C. voltages appearing on conductors 508 and 509 are conducted to a log ratio meter more fully described in my above-identified copending application. The log ratio meter comprises comparators 510 and 512. The voltage from a resistive-capacitive timing circuit 514 is also applied to the comparators. Timing circuit 514 comprises fixed resistors 516, 518, and a fixed capacitor 520. The circuit also comprises an adjustable potentiometer 521 that is controlled by a knob 522 located on console 502 (FIG. 1). Means 523 described hereafter are provided for applying charging pulses along a conductor 524 and through a diode 525 to capacitor 520 in order to charge the capacitor to a predetermined negative voltage. The negative voltage is sufficiently large so that conductors 508 and 509 are biased below ground potential for the duration of the charging pulse. When the charging pulse is terminated, the voltage on the conductors varies monotonically. More specifically, it begins to exponentially decay toward ground potential. Generally, conductor 509 reaches ground potential before conductor 508. As soon as conductor 509 reaches ground potential, comparator 512 generates a pulse which switches a flip-flop circuit 527 to its 1 state, thereby causing an exclusive OR gate 528 to initiate an analysis signal. The analysis signal is automatically converted to digital form by a converter circuit 529 comprising a flip-flop circuit 530, a crystal controlled pulse generator 532 that produces pulses at a rate of 200KC, and an up-down gate 534. The initiation of the analysis signal also switches flip-flop 530 to its 1 state so that pulses from generator 532 are transmitted through up-down gate 534 and are counted by a counter 536. When conductor 508 reaches ground potential, comparator 510 generates a pulse which switches a flip-flop circuit 526 to its 1 state, so that gate 528 is returned to its original state, thereby terminating the analysis signal. This prevents any additional pulses from entering counter 536.

It will be appreciated that the duration of the analysis signal is proportional to the concentration of substance A in the specimen being analyzed.

Moreover, by using the above-described circuitry, the number of pulses counted by counter 536 equals log (JP2 + KP3)/LP1, where P1, P2 and P3 represent the magnitude of pulses P1, P2 and P3, respectively. With the proper selection of J, K and L constants, the output can be made to read directly in desired units, such as mg per liter or international activity units. By using the circuitry, intefering substances B and C are automatically compensated for without physically separating them from substance A. Moreover, since the specimens are analyzed instantaneously, the compensation can be achieved while substance A is reacting.

Processing Circuit

Still referring to FIG. 23, processing circuit 540, which controls the logic of the overall system, may be operated in either an updating mode that is used for adjustment or in an operating mode. These modes are controlled by an update selector circuit 544 that is operated through a momentary update switch 546 and an operating selector circuit 548 that is operated through a momentary start switch 550 and a momentary stop switch 552. These circuits are electronically interlocked so that both cannot be used simultaneously. In the update mode, the analyzing apparatus take a reading and displays it on a conventional Nixie display device 563 every second. As shown in FIG. 1, the display device comprises a section 581 that displays the identity code of the cuvette compartment in the analyzing position, a section 582 that displays a value of the specimen, such as concentration, in mg per liter or international activity units, and a section 582a that displays the number of the revolution through which the carrousel is proceeding. The identity code is displayed through a decoder 574 which receives signals from five photo transistors 154 that are located behind the coded hole sets in cylindrical skirt 132 of the carrousel assembly.

In the normal operating mode, a master clock 542 sends out start pulses at regular intervals, such as every 9.375 seconds, 15 seconds, 18.75 seconds, 30 seconds, or 37.5 seconds. By means of a time selector 556, the desired start pulse is selected to give one revolution of the carrousel every 5, 10 or 20 minutes. This selection can be made by means of knob 558 on console 502 that controls a five-position switch 557.

The selected start pulse is conducted through time selector 556 to a series of gates 560. The gates control the operation of a memory 562, display device 563, a printer 564, and pulse counter 563 in order to provide the following modes of operation:
1. Slow reaction rate determinations;
2. Rapid reaction rate determinations; and
3. End point determinations.

The operation of gates 560 is controlled by an up-down switch 568 that is coupled to a knob 569 of the console, and by a rate-end point switch 570 is coupled to a knob 571 of the console. Printer 564 is of a conventional type that is capable of printing information on a roll of paper 585.

A revolution counter 566 is energized once during each cycle of the carrousel by a predetermined identity code received from a particular coded hole set in cyclindrical skirt 132. This information is decoded by a NAND gate 656b7. The revolution counter energizes a revolution select circuit 572 that is controlled by a knob 573 on the console. Knob 573 may be adjusted so that the apparatus automatically turns off after a predetermined one of 2-4 revolutions of the carrousel.

Figure 29:
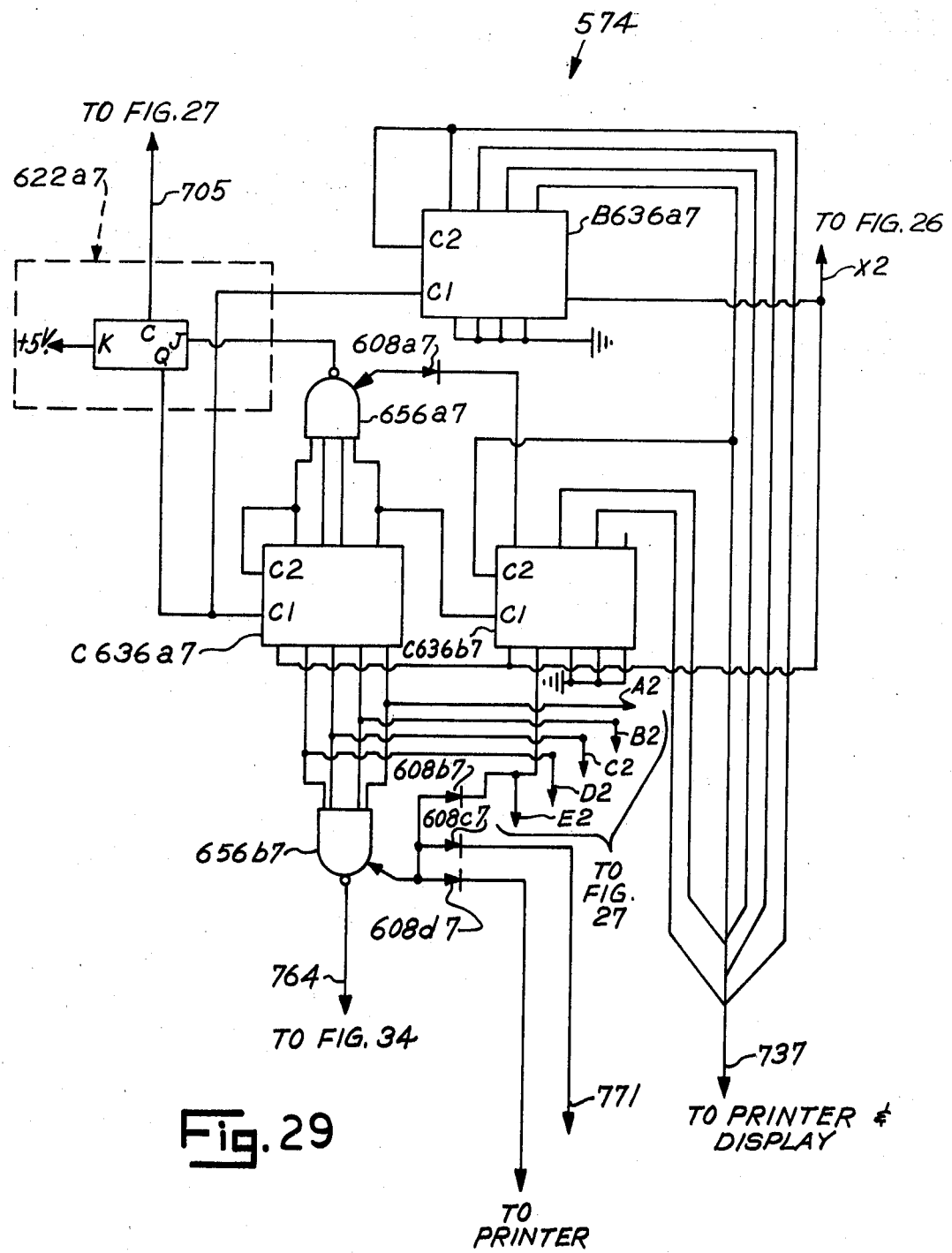
FIG. 29 is a schematic diagram illustrating a preferred form of a decoding circuit.

The printer and display device are operated by binary to BDC decoder 574 shown in FIG. 29.

By using the master clock, gates and revolution counter of the type shown herein, applicant has invented a processing circuit which enables maximum flexibility of operation with a minimum of circuit components. By using this design feature, applicant has been able to employ essentially the same circuitry in order to achieve several different modes of analysis.

A detailed illustration of a preferred dispenser control circuit 260 is illustrated in FIG. 18. Likewise, a detailed description of a preferred embodiment of analyzing apparatus 400, processing circuit 540 and memory 562 is found in FIGS. 24–35. In each of FIGS. 18 and 24–35, the reference numbers are used to identify components of the type described in the following Table A:

TABLE A

| Reference Number | Type of Component |
|---|---|
| 604 | resistor |
| 606 | capacitor |
| 608 | diode |
| 609 | solenoid winding |
| 610 | junction transistor |
| 611 | thyristor |
| 612 | field-effect transistor |
| 616 | traic |
| 624 | switch contact |
| 626 | switch wiper |

In FIGS. 18 and 24–35, other reference numbers are used to identify components described as follows in Table B:

TABLE B

| Reference No. | Type of Component | Manufacturer | Part or Model No. |
|---|---|---|---|
| 601 | bias amplifier | National Semiconductor Corp. | LM-301 |
| 602 | filter | National Semiconductor Corp. | LM-302 |
| 614 | Hex-inverter | Texas Instruments, Inc. | 7404 |
| 636 | counter module | National Semiconductor Corp. | 8560 |
| B636 | counter module | Signetics Corp. | 8292 |
| C636 | counter module | Signetics Corp. | 8293 |
| 637 | NAND gate | Signetics Corp. | 337 |
| 644 | memory module | Intel Corp. | 3101 |
| 656 | NAND gate | Signetics Corp. | 356 |
| 670 | NOR gate | Signetics Corp. | 370 |

| 677 | NAND gate | Signetics Corp. | 377 |
| 680 | NOR gate | Signetics Corp. | 380 |
| 684 | OR gate | Signetics Corp. | 384 |
| 686 | unity gain amplifier | National Semiconductor Corp. | 310 |
| 687 | NAND gate | Signetics Corp. | 387 |

In addition, in the FIGS. 18 and 24–35, all conductors are indicated by numbers from 700–799. Like-numbered conductors are connected together.

The NAND, NOR and OR gates shown in the drawings are conventional logic gates that produce one of two voltage levels at their output terminals in response to voltages transmitted to their input terminals. When switched to their one state, the gates produce a relatively high voltage at their output terminals, and when switched to their zero state, the gates produce a relatively low voltage at their output terminals.

Operation of the System

A. Operation In The Updating and Adjustment Mode

In order to operate the system in the update mode, the operator depresses a switch 577 on console 502 that energizes a power supply (not shown). The power supply is connected to all of the electrical apparatus and supplies the various D.C. and A.C. voltages indicated on the drawings. In particular, the power supply energizes motor 444 which causes filter disc 410 to rotate in the manner previously described. In addition, the power supply causes source 402 to produce a beam of ultraviolet and visible light. As a result, light pulses are continuously transmitted in a single optical path 454 through the specimen held in the cuvette compartment located in the analyzing position. For example, as shown in FIG. 5, light pulses are transmitted through compartment 83 which is illustrated in the analyzing position. As previously explained, the pulses of light transmitted through the specimen in the analyzing position are converted to corresponding electrical signals by photomultiplier tube 462 (FIG. 23). The electrical signals are then detected, filtered, and summed by components of comparison circuit 489. As a result, D.C. signals appropriate for comparison by comparators 510 and 512 are continuously produced on conductors 508 and 509. However, the signals are not actually compared to produce an analysis signal on conductor 702 until the source of charge pulses 523 is energized by gates 560.

Figure 33:
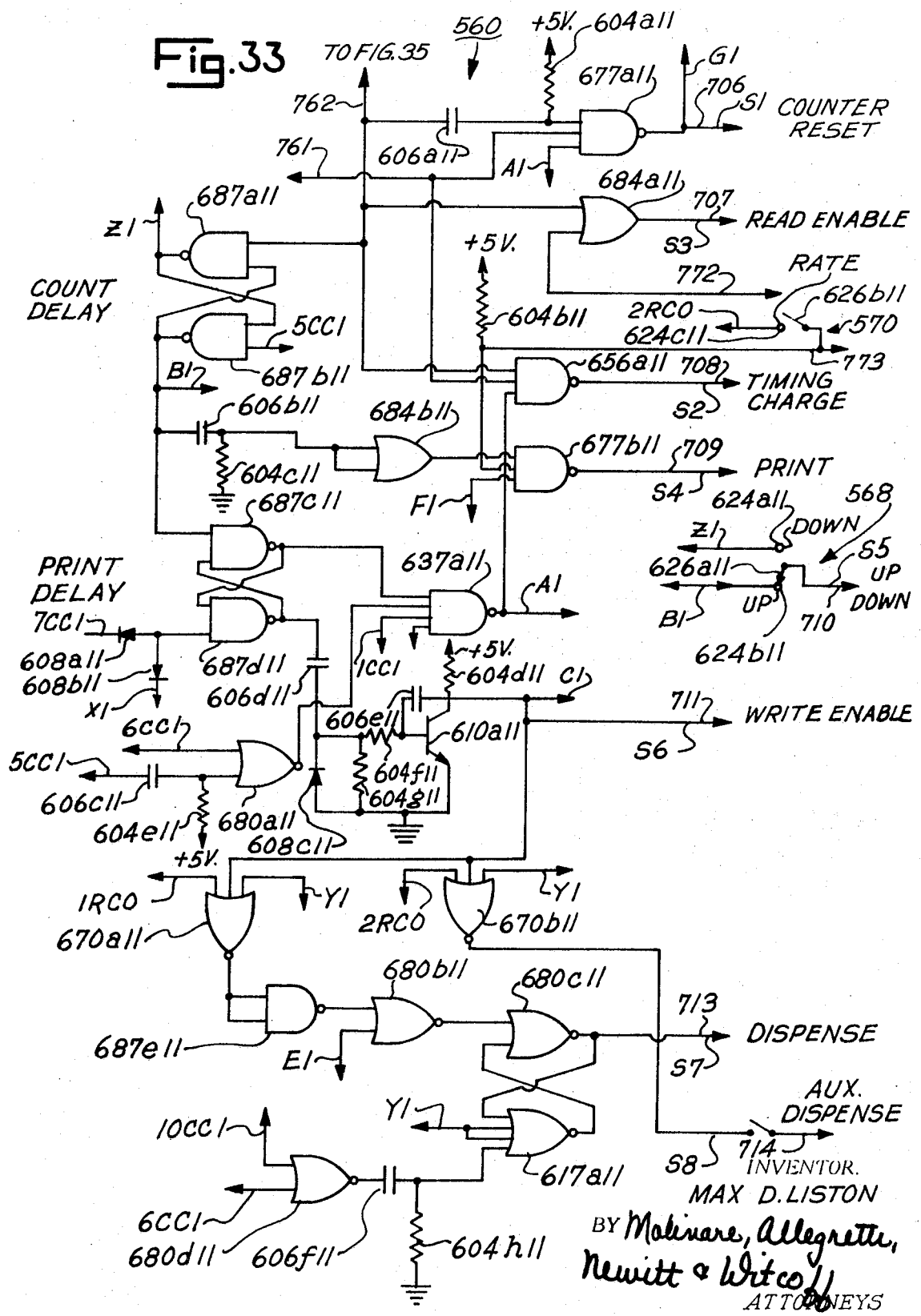

In order to operate the system in the update mode, update switch 546 (FIG. 30) is momentarily closed, thereby activating update selector 544. Basically, the update selector enables data concerning a single specimen held in the analyzing position to be generated and displayed approximately once each second. The update selector prevents clock 542 from counting sufficiently far to give a start pulse, so that normal operations are prevented. As shown in FIG. 30, update selector 544 comprises two NOR gates 670a8 and 670b8. When update switch 546 is momentarily closed and then opened, gate 670b8 is switched to its zero state, and gate 670a8 is switched to its one state. This operation, in turn, causes gate 617a8 to be switched to its zero state and gate 680a8 to be switched to its one state. Due to the one state condition of NOR gate 670a8, transistor 610a8 conducts current, thereby causing the update bulb 580 to glow. As soon as the system begins to operate, a 24 volt 60 cycle A.C. signal is introduced to clock 542 from a source of such signals 576. Clock 542 is a 12 stage binary counter or frequency divider in which each stage produces pulses at its Q output at one half the frequency of the input pulses at its C input. When the clock is reset, the Q output of each stage produces a relatively low voltage so that each stage is in its zero state. When any stage receives a first positive pulse at its C input, its Q output is switched to a relatively high voltage, so that the stage is in its one state. When the stage receives a second positive pulse at its C input, it returns to a zero state. As soon as the clock has counted through five stages, NAND gate 637a9 (FIG. 31) is switched to its zero state, thereby causing NAND gates 677a11 and 656a11 to switch to their one states (FIG. 33). As a result, signals S1 and S2 (FIG. 36) are produced on output conductors 706 and 708 respectively (FIG. 33). In response to signal S1, each of the counter modules of counter 536 is reset to a zero value, and in response to signal S2, source 523 causes timing capacitor 520 to be charged to a negative voltage (FIG. 23). As a result, comparators 510 and 512 compare the magnitudes of the electrical signals produced by the generating apparatus in order to provide an analysis signal on conductor 702. As previously described, the analysis signal is converted to a series of digital pulses by means of pulse generator 532 and up-down gate 534. The pulses are then counted by counter 536 and the results are displayed on display device 563. Clock 542 is then reset through OR gate 384a9 (FIG. 31) which is locked in its one state by NOR gate 680a8, and the cycle of operation commences again. As a result, display device 563 displays a value proportional to the concentration of the specimen held in the analyzing position approximately once each second.

In order to adjust the system during the updating mode of operation, the operator depresses the calibrate button 584 (FIG. 1) which operates switch 583 (FIG. 25). By depressing the calibrate button, switch 583 is moved from the position shown in FIG. 25 to a position in which wipers 626a3 and 626b3 are moved into contact with contacts 624a3 and 624b3, respectively. The values of resistors 604ff3–604ii3 are calibrated so that the resulting voltage between the switch contacts is in the ratio of 0.7943:1, which corresponds to an absorbence of one unit. After the calibrate button has been depressed, variable resistor 521 (FIG. 26) is adjusted until the counter output reads 100. In the alternative, a standard specimen having a known concentration can be located in the analyzing position. In this case, the calibrate button is not operated, but resistor 521 is adjusted until the reading of the counter corresponds to the known concentration of the standard specimen.

In addition to the foregoing adjustments, potentiometer 499 (FIG. 25) is adjusted in order to properly balance the electrical signals resulting from light pulses P2, P3 that are transmitted at different wavelengths. The adjustment can be made by empirical methods as follows. A specimen substantially free of a particular interferent is moved into the analyzing position and the reading of the counter is noted. Then, a specimen having a substantial amount of the particular interferent is moved into the analyzing position, and potentiometer 499 is adjusted until the count of the counter is identical with the count obtained with the interferent free specimen. Those skilled in the art are also aware of additional analytic methods by which the setting of potentiometer 499 may be obtained by studying the absorbence curves of the various substances in a specimen.

In addition to the foregoing adjustments, the system is "zeroed" by use of adjustable resistor 604113 (FIG. 25). In order to make the zero adjustment, a blank specimen, such as water, is moved into the analyzing position and the output of the counter is noted. Then, resistor 604113 is adjusted so that the output of the counter is zero. By making this adjustment, the voltage levels on conductors 508 and 509 are made identical so that comparators 510 and 512 produce output pulses simultaneously. As a result, no pulses are allowed to enter counter 536 and the system is properly zeroed.

B. Operation For Slow Rate Determinations

One of the advantages of the present invention is that the rates of reactions occurring in dozens of specimens may be determined and recorded simultaneously, thereby reducing the overall time required in order to complete the analysis. In order to achieve this mode of operation, the operator places test tubes containing thirty two separate samples in the openings provided for that purpose in the carrousel as shown in FIG. 9. As shown in FIG. 5, the operator must place the test tube so that the liquid level in each coincides with the upper surface of the horizontal ring member 136. The test tubes are then retained in these positions by the spring clips such as clips 143, 144. Of course, an appropriate reagent fluid must also be located in reagent reservoir 272.

Referring to FIG. 30, after the test tubes are positioned in the carrousel, start switch 550 is momentarily closed and then opened, thereby switching NOR gate 680a8 in its zero state and NOR gate 617a8 to its one state. As a result, transistor 610c8 is switched to its conductive state, thereby allowing current to flow through run light 578.

The operator also moves the rate-end point switch 570 to the rate position and moves the up-down switch 568 to the up position.

Referring to FIG. 23, the rates of reactions of the thirty two samples are determined basically as follows. Clock 542 sends out its start pulses at intervals of 9.375 seconds, 18.75 seconds, and 37.5 seconds which result in the revolution of the carrousel every 5, 10 or 20 minutes, respectively. Thus, by transmitting the proper start pulse through time selector switch 557, the operator can control the rate at which the carrousel rotates. Upon receiving a start pulse, gates 560 are enabled to produce the output pulses shown in FIG. 36. However, during certain revolutions of the carrousel, some of the output pulses are disabled.

On the first revolution of the carrousel, display device 563 and printer 564 are disabled so that as far as the operator is aware, only the dispenser assembly is functioning. As each test tube advances to a position below probe assembly 260 (i.e., to the analyzing position), a dispense pulse S7 is sent to the dispenser assembly, thereby causing the sample fluid in the test tube to be mixed with the reagent fluid and dispensed into the corresponding cuvette compartment as previously described. At the end of the first carrousel revolution, each of the cuvette compartments is filled in the manner previously described with a specimen to be analyzed.

During the second revolution, the dispenser assembly is disabled and the printer is also disabled. The value of the analysis signal obtained as each specimen enters the analyzing position is written into memory 562 at the address assigned to that specimen by its corresponding coded hole set. This value and the corresponding address is also displayed in display device 563. More particularly, identity code of the specimen being analyzed at any time is displayed in specimen indicator 581, and the concentration of the desired substance in the specimen is displayed in unit indicator 582, both located on console 502. By using this mode of operation, the operator can observe the values being written into memory 562 except at positions where no test tube or specimen is present. In carrousel positions at which no test tube is present, the display device and printer are always disabled.

Figures 35, 36:
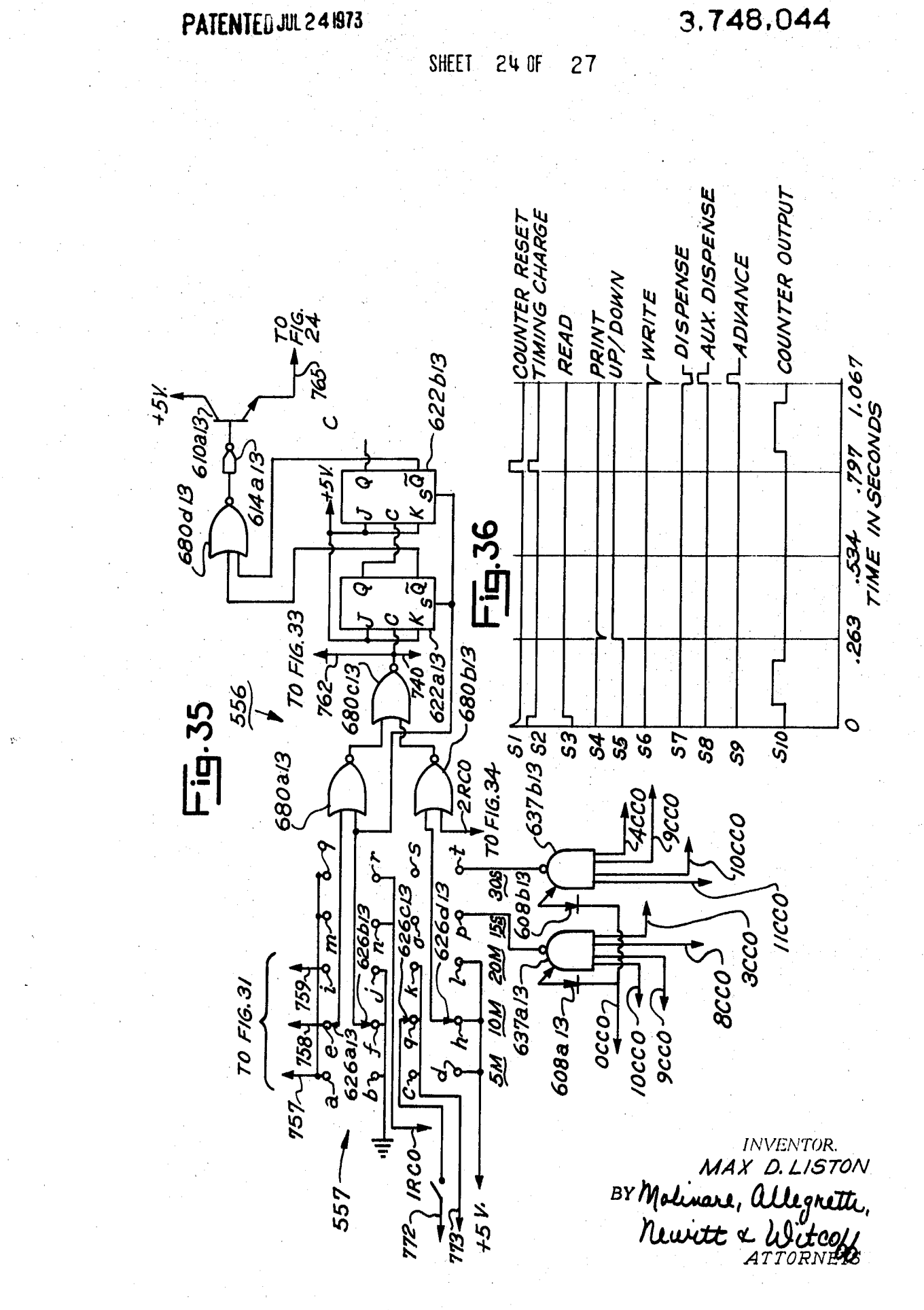

On the third revolution of the carrousel, the dispenser assembly is disabled, but all other functions shown in FIG. 36 are operative. During the third revolution, gates 560 cause the following steps to be performed in sequence:

1. Counter 536 is reset to a zero value.
2. The value stored in memory 562 during the previous revolution that corresponds to the specimen located in the analyzing position is read out of the memory and loaded into counter 536 in an upcount mode of operation.
3. Circuit 523 is energized so that the analyzing apparatus produces a first analysis signal corresponding to the present value of the specimen in the analyzing position.
4. The value of the first analysis signal is converted to digital form and is entered into counter 536 in a down count mode of operation so that it is subtracted from the value obtained form memory 562 in order to obtain a remainder value.
5. The remainder value is displayed by display device 563 and is printed by printer 564.
6. Counter 536 is again reset to a zero value.
7. Circuit 523 is again energized in order to produce a second analysis signal corresponding to the same specimen in the analyzing position.
8. The value of the second analysis signal is converted to digital form and is entered into counter 536 in an up count mode of operation.
9. The value in counter 536 is read into memory 562 at the address indicated for the specimen in the analyzing position.
10. Cycling apparatus 168 is energized so that the next successive specimen is moved into the analyzing position.

The foregoing cycle of operation continues until each of the specimens has been analyzed during the third revolution of the carrousel. The foregoing operation can continue through four or more revolutions of the carrousel, depending on the position of revolution select circuit 572, thereby obtaining verification of the results and proving the linearity of the rates of reaction. If circuit 572 is set to terminate the analysis at the end of three carrousel revolutions, the operating selector 548 is turned off at the conclusion of the third revolution, and a bell is sounded to notify the operator that the analysis is finished.

Figure 27:
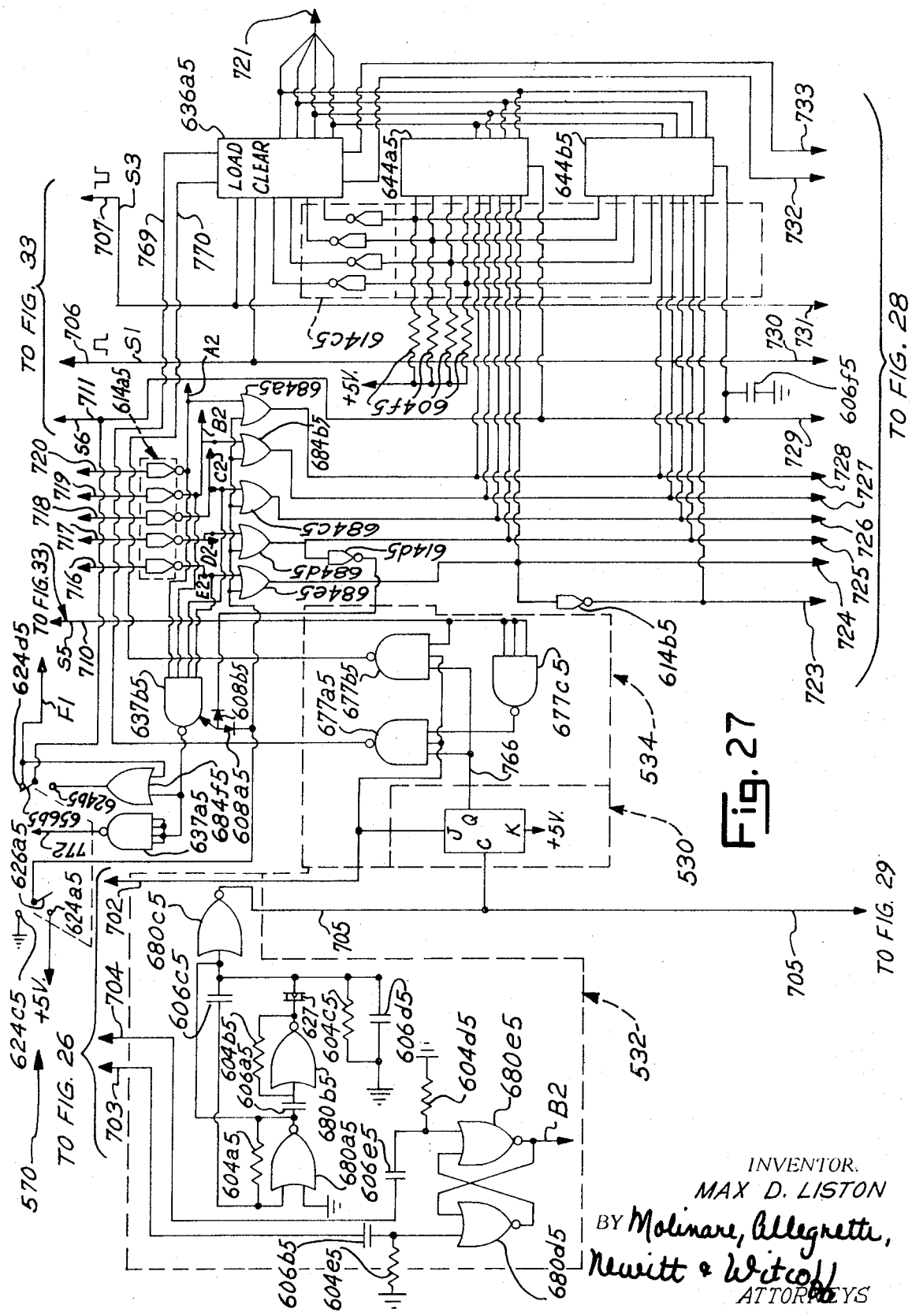
FIG. 27 is a schematic diagram illustrating a preferred form of converter circuit, and a portion of a preferred form of a counter and memory circuit used in connection with the present invention.

Referring to FIGS. 30–38, the operation of the apparatus for slow rate determinations will be described in more detail. As previously described, start switch 550 (FIG. 30) momentarily is closed and switch 570 is moved to its rate position. By moving switch 570 to its rate position, wiper 626b11 is moved into contact with contact 624c11 (FIG. 33), and wipers 626a5 and 626b5 are moved into contact with contacts 624c5 and 624d5, respectively (FIG. 27).

For reactions in which the substance of interest becomes progressively more dense switch 568 is moved to its up position (i.e., the position shown in FIG. 33), so that values are read from the memory into the counter in an up count mode. For the reverse type of reactions, switch 568 should be moved to the down position.

In addition, the operator positions switch 557 (FIG. 35) so that the carrousel requires either 5, 10 or 20 minutes for the completion of one revolution. The following description will be made assuming that switch 557 is moved to the 5 minute position wherein wipers 626a13–626d13 are moved into contact with contacts 557a–557d, respectively (FIG. 35).

Figures 31, 32:
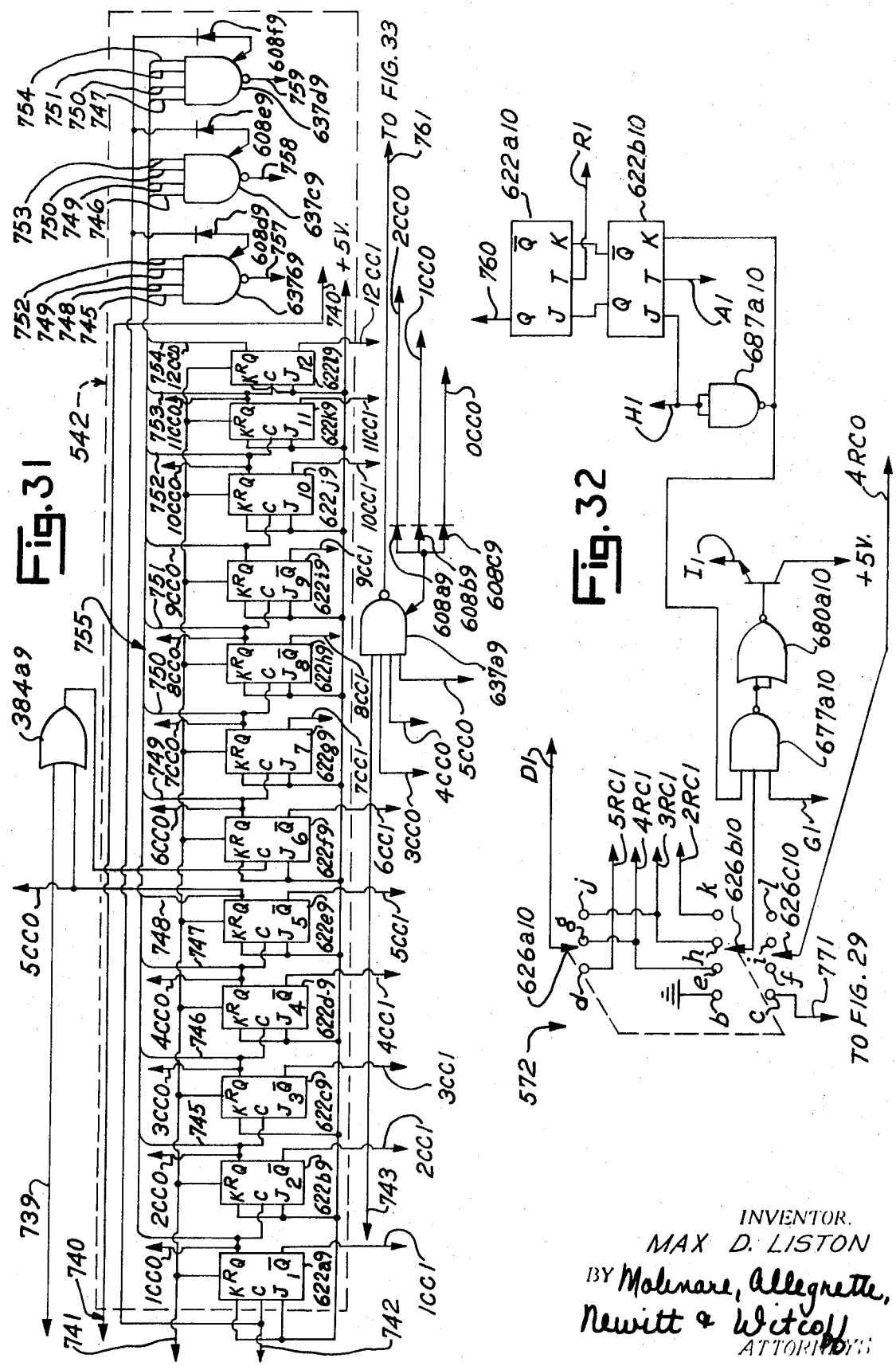

The operator also sets the revolution select circuit 572 to determine the number of revolutions through which the carrousel will travel. The following description will be made assuming that the circuit is set to terminate the analysis after three revolutions. To achieve this result, wipers 626a10–626c10 are moved into contact with contacts 572d–572f, respectively (FIG. 32).

When the foregoing switches are in the positions indicated, clock 542 (FIG. 31) receives 60 cycle signals from source 576 (FIG. 30) and proceeds to count in the manner described previously. The clock continues to count until NAND gate 637b9 (FIG. 31) is switched to its zero state. This occurs 9.375 seconds after the clock begins its counting cycle. At this point, a negative pulse is transmitted through switch 557 (FIG. 35) to NOR gate 680a13 which is switched to its one state. In response to this signal, NOR gate 680c13 is switched to its zero state, thereby sending a negative start pulse over conductor 762 to gates 560. If switch 557 were in the 10 minute or 20 minute positions, the operation would be similar since NOR gate 680b13 is locked up when the switch 557 is in its 5, 10, or 20 minute positions. The negative start pulse transmitted over conductor 762 is also transmitted over conductor 740 to reset the clock through OR gate 684a8 (FIG. 30) and NAND gate 656a8. More specifically, OR gate 684a8 is switched to its one state on the trailing edge of the start pulse, thereby switching NAND gate 656a8 to its zero state. As a result, the clock is reset to a zero value and immediately begins to count through another cycle.

Referring to FIG. 33, in response to the negative start pulse transmitted over conductor 762, gates 560 would produce each of the signals shown in FIG. 36 if certain of the gates were not disabled during the various revolutions of the carrousel. If no such gates were disabled, the pulses would be produced as follows:

Upon receipt of the negative start pulse from conductor 762, signals S1 and S2 are immediately produced through NAND gates 677a11 and 656a11, respectively. In response to the receipt of the start pulse, NAND gate 687a11 is switched to its one state and NAND gate 687b11 is switched to its zero state. As a result, a negative up-down signal S5 is transmitted over conductor B1 and through up-down switch 568. As soon as the fifth stage of clock 542 (i.e., flip-flop circuit 622e9) is switched to its one state (FIG. 31), the states of NAND gates 687a11 and 687b11 (FIG. 33) are reversed, thereby changing the polarity of signal S5 as shown in FIG. 36. This switching also causes a print signal S4 to be produced through OR gate 384b11 and NAND gate 677b11. In addition the switching of NAND gates 687a11 and 687b11 causes NAND gate 687c11 to be switched to its one state and NAND gate 687d11 to be switched to its zero state. Thereafter, when the fifth and sixth stages of clock 542 (i.e., flip-flop circuits 622e9 and 622f9) are switched to their one states (FIG. 31). NOR gate 680a11 (FIG. 33) is switched to its one state, thereby causing NAND gate 637a11 to be switched to its zero state. The output of NAND gate 637a11 then transmits a negative pulse to NAND gate 677a11, thereby causing the production of another counter reset signal S1 as shown in FIG. 36. Likewise, the negative pulse from NAND gate 637a11 switches NAND gate 656a11 to its one state, thereby creating another timing charge pulse S2 as shown in FIG. 36. Subsequently when the seventh stage of clock 542 (i.e., flip-flop circuit 622g9) (FIG. 31) is switched to its one state, NAND gate 687c11 is switched to its zero state and NAND gate 687d11 is switched to its one state. As a result, a negative write enable pulse S6 is produced on conductor 711 as shown in FIG. 36. The write pulse triggers gates 670a11, 687e11, 680b11, and 680c11 in order to produce a dispense pulse S7 on conductor 713 and an auxiliary dispense pulse S8 on conductor 714. Referring to FIG. 34, the negative write pulse S6 is also transmitted over conductor L1 to NOR gate 617a12 which produces an advance pulse S9 as shown in FIG. 36 through transistor 610b12 and triac 616a12.

After each of the signals S1–S9 are produced as shown in FIG. 36, the gates 560 remain inactive until NAND gate 637b9 (FIG. 31) is again switched to its zero state, thereby producing a start pulse which results in another cycle of signals S1–S9.

Referring to FIG. 34, as soon as start switch 550 is closed, a positive signal is transmitted over conductor C1 that resets all flip-flops of revolution counter 566. Revolution counter 566 is a ring counter in which stage 0 (i.e., flip-flop 662a12) is switched to its zero state (i.e., with its Q output producing a relatively low voltage) when the counter is reset. All other stages 1–5 are reset to their one states. Whenever, a negative pulse is received over conductor 764, the stage in its zero state is switched to its one state, and the next succeeding stage is switched to its zero state. Since each revolution of the carrousel is terminated at a position opposite the coded hole set which switches NAND gate 656b7 (FIG. 29) to its zero state, the counter is immediately stepped to stage 1 after the reset pulse is received so that flipflop 622b12 is switched to its zero state. At the end of one complete revolution of the carrousel, NAND gate 656b7 is again switched to its zero state so that flip-flop 622c12 is switched to its zero state.

Figure 37A:
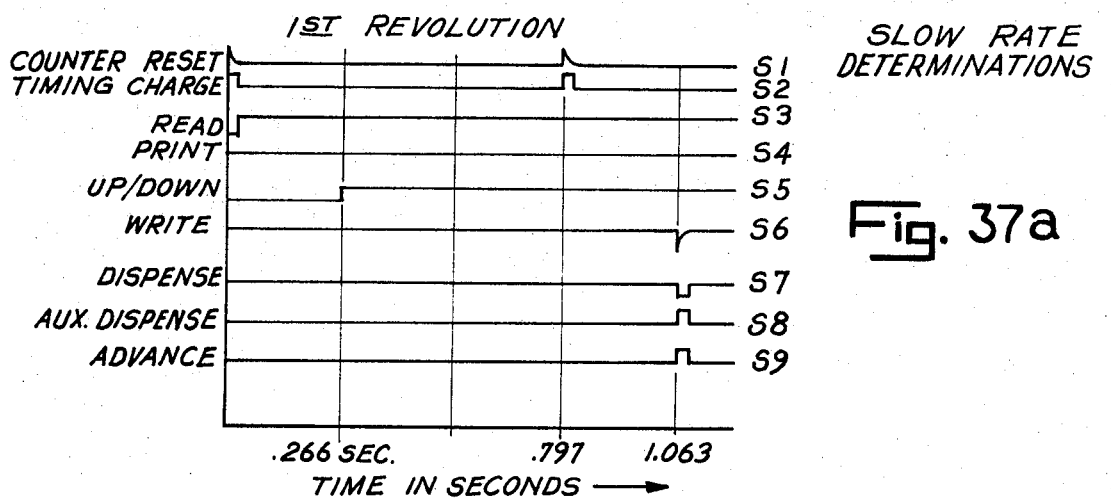
Figure 37B:
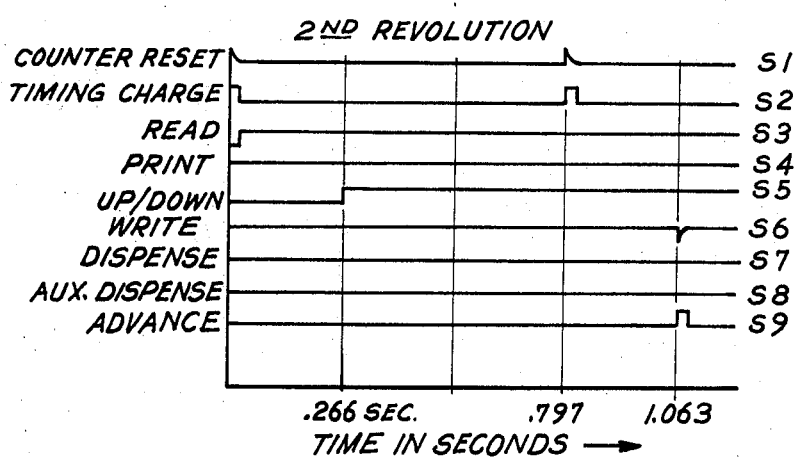
Figure 37C:
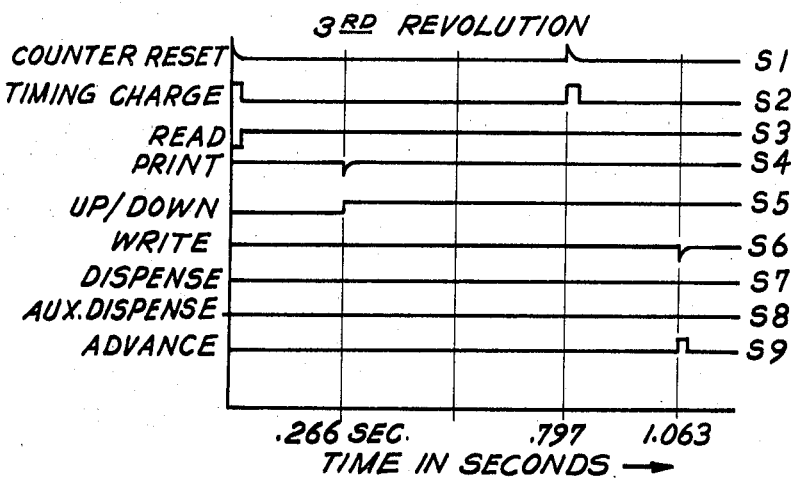

The actual pulses produced by gates 560 during three revolutions of the carrousel for a slow rate determination are shown in FIGS. 37a–37c. During the first revolution, stage 1 of the revolution counter is in its zero state. As a result, as shown in FIG. 37a, each of the signals previously described is produced, except for the print signal S4. Referring to FIG. 30, the print signal and display device are disabled by the revolution counter through NAND gate 687a8 and NOR gate 680d8. Since both the printer and display device are disabled during the first revolution, the operator is aware only of the operation of the dispenser assembly.

Referring to FIG. 30, the dispense signal S7 is enabled by the revolution counter through NOR gate 670a11. As previously described, after the receipt of each dispense signal, the dispenser assembly mixes sample fluid from each test tube with the reagent fluid in reservoir 272 and deposits a predetermined amount of each fluid in a corresponding cuvette compartment. After a cuvette compartment is filled with a specimen, dispense and advance pulses are simultaneously generated so that the next compartment is rotated into the analyzing position and is filled. As a result, at the end of one revolution of the carrousel, each of the cuvette compartments is charged with a specimen to be analyzed.

If a test tube is missing from any position on the carrousel, the dispense signal S7 is disabled through mercury switch 166 and NAND gate 687b8 (FIG. 30), so that the carrousel automatically advances to the next test tube location. As previously explained, mercury switch 166 is located in the position ahead of the analyzing position in order to provide more time for the operation of the dispenser assembly. As a result, in order to disable display device 563 and printer 564, if a test tube is absent, the apparatus must "remember" the missing test tube when the carrousel that advances to the analyzing position. This mode of operation is achieved by means of flip-flop circuits 622a10 and 622b10 (FIG. 32). These flip-flops operate through NAND gate 687a8 (FIG. 30) in order to perform the disabling function.

During the second revolution of the carrousel, the print signal S4 is disabled through switch contact 624c11 (FIG. 33). However, the display device 563 is enabled since the zero state input is removed from NAND gate 687a8 (FIG. 30) by the switching of revolution counter 566 to stage 2. The dispense signal is also disabled by the removal of the zero state signal from input conductor IRCO of NOR gate 670a11 (FIG. 33).

During the second revolution of the carrousel, each of the specimens is analyzed and the value of the specimens is written into memory 562. This operation is achieved through the series of pulses S1–S9 shown in FIG. 37b that are produced in the above-described manner by gates 560.

As soon as a specimen enters the analyzing position, its identity code is read by phototransistors 154 and is transmitted over conductors 716–720 (FIG. 27). The code is then transmitted through OR gates 684a5–684e5 to each of the memory modules 644 so that the value of the specimen can be written into the memory in connection with its unique indentity code.

Figure 28:
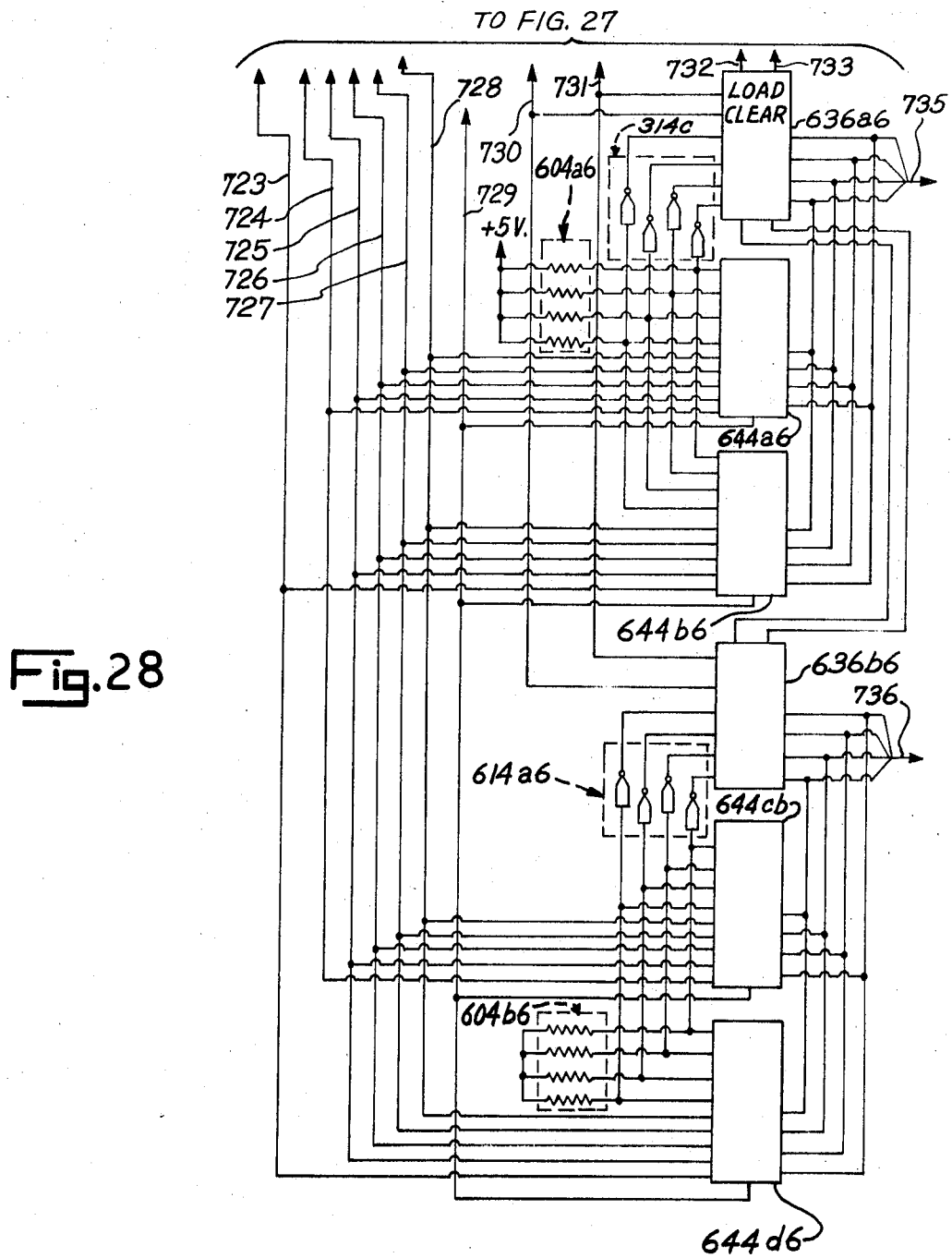
FIG. 28 is a schematic diagram illustrating another part of a preferred form of memory and counter circuit used in connection with the present invention.

A separate series of signals S1–S9 is produced for each specimen that enters the analysis position during the second revolution of the carrousel. When signal S1 is produced for the second time as shown in FIG. 37b, each of the counter modules 636 is cleared by the positive signal transmitted over conductor 706 (FIGS. 27 and 28). When signal S2 is produced, for the second time, circuit 523 is energized (FIG. 26), thereby producing an analysis signal on conductor 702. Since signal S5 is in its one state during the time, NAND gate 677b5 (FIG. 27) is enabled, so that pulses are transmitted from pulse generator 532 over conductor 770 to counter modules 636. As a result, counter modules 636 count the pulses in an up count mode, and the resultant value is displayed on display device 563. When signal S6 is transmitted over conductor 711, the values in the counter modules are transferred to memory modules 644 in connection with the identity code of the specimen. At the same time, an advance pulse S9 is transmitted to solenoid 170 so that the next specimen is transmitted into the analyzing position in the manner previously described. As a result, after the second revolution is completed, a value for each of the specimens is stored in memory modules 644. At the end of the second revolution, the revolution counter is advanced to its third stage, thereby removing the zero state signal from switch contact 624c11 (FIG. 33) and enabling NAND gate 677b11 to produce a print pulse S4.

During the third revolution, gates 560 produce the series of pulses S1–S9 shown in FIG. 37c for each of the specimens analyzed. As soon as a specimen is located in the analyzing position, the coded holes that correspond to the specimen are read by phototransistors 154 (FIG. 23). The identity code produced by these phototransistors is transmitted over conductors 716–720 and through hex inverters 614a5 and OR gates 684a5–684e5 (FIG. 27) to each of memory modules 644. As soon as a start pulse is received by gates 560, counter reset pulse S1 is transmitted over conductor 706 to clear each of counter modules 636 to a zero value. Simultaneously, a read pulse S3 having a duration longer than pulse S1 is transmitted over conductor 707 so that the value recorded in the memory modules for the corresponding identity code is loaded into counter modules 636 after the termination of pulse S1. At the same time, signals S1 and S3 are transmitted, a timing charge pulse S2 is transmitted to circuit 523 (FIG. 26), thereby enabling the analyzing apparatus to produce an analysis signal on conductor 702. Since up-down signal S5 is in its zero state at this time, NAND gate 677a5 (FIG. 27) is enabled so that pulses from pulse generator 532 are transmitted over conductor 769 in order to cause each of counter modules 636 to count in a down mode. As a result, the value of the pulses transmitted through up-down gate 534 is subtracted from the value loaded into the counter modules from the memory modules in order to create a remainder value. This remainder value is displayed in display device 563. In addition, as soon as print pulse S4 is produced, the value and corresponding identity code is printed by printer 564 on paper roll 585. At the same time, up-down signal S5 is switched to its one state, thereby enabling NAND gate 677b5 (FIG. 27). Additional pulses S1 and S2 are then produced in order to create an analysis signal corresponding to the present value of the specimen in the analyzing position. As a result, pulses from the pulse generator are transmitted over conductor 770 so that counter modules 636 count in an up mode. Thereafter, write signal S6 is transmitted over conductor 711 (FIG. 27), so that the value in the counter modules is stored in memory modules 644 in connection with the identity code being transmitted over conductors 716–720. At the same time, advance signal S9 is transmitted to solenoid 170 so that the carrousel advances the next cuvette compartment into the analyzing position in the manner described previously. Thereafter, as soon as another start pulse is received by gates 560, the next specimen is analyzed in the same manner.

Referring to FIG. 32, as soon as the third revolution of the carrousel is completed, the revolution counter steps to its fourth stage, thereby switching gates 677a10 and 680a10 so that a pulse is transmitted over conductor I1 to NOR gate 617a8 (FIG. 30). As a result, gate 617a8 is switched to its zero state and gate 680a8 is switched to its one state, thereby terminating the operation of the processing circuit and ringing bell 586 to indicate that the analysis is completed.

Another feature which enables the carrousel to repeat the last rotation cycle independently is achieved through the lowermost wiper of revolution select circuit 572. By placing wiper 626c10 in contact with contact 572c (FIG. 32), NAND gate 656b7 (FIG. 29) is locked up when the revolution counter steps to stage four. As a result, the carrousel continues to revolve until stop switch 552 is operated.

C. Operation During Rapid Rate Determinations

By moving switch 557 (FIG. 35) to the 15 second or 30 second positions, the system analyzes reactions that occur at a rapid rate. During the following description, it will be assumed that switch 557 is moved so that wipers 626a13–626d13 are moved into contact with contacts 557m–557p, respectively. When the switch is in this position, the first revolution of the carrousel is completed in exactly the same manner previously described as if switch 557 were in the 5 minute position. As a result, during the first revolution, the dispenser transfers liquid from each test tube to a corresponding cuvette compartment in the manner previously described.

Referring to FIG. 35, at the end of the first revolution, when the revolution counter steps to stage 2, gate 680a13 is disabled, gate 680b13 is enabled, and flip-flop circuits 622a13 and 622b13 also are enabled. The flip-flop circuits comprise a conventional binary counter which lock out the advance mechanism through NOR gate 680d13 and transistor 610a13 until the circuits have received four pulses.

Every 15 seconds during the second revolution, NAND gate 637a13 produces a pulse that is gated through gates 680b13 and 680c13 to provide a start pulse. The start pulse results in the production of the same signals described in FIG. 37c, except that the advance pulse S9 is disabled and the auxiliary dispense pulse S8 is enabled. As a result, after the production of the initial start pulse, another specimen is advanced into the analyzing position and a trigger substance is dispensed into the specimen in order to start the rapid reaction. The dispensing of the trigger substance is achieved through an auxiliary dispenser (not shown) which may be constructed like dispenser assembly 200. The auxiliary dispenser is energized by the auxiliary dispenser signal S8 in the same manner that dispenser assembly 200 is energized by dispense signal S7. As soon as the trigger substance is dispensed, the specimen in the analyzing position is analyzed and the value thereof is read into the memory modules through signals S1–S6 in the manner previously described. Fifteen seconds later, another start pulse causes the value written into the memory modules to be loaded into the counter modules. Then the specimen is again analyzed and a new value of the specimen is subtracted from the previous value in the manner described above. The remainder value in the counter is then printed out and another new value is written into the memory modules as previously described. Every fifteen seconds, another start pulse is generated, thereby repeating the process. In order to establish linearity, the process continues for four start pulses, or one minute. At the end or 1 minute, NOR gate 680d13 allows the advance pulse S9 to be generated, thereby moving the next specimen into the analyzing position. Thereafter, the cycle is again repeated for the next specimen.

D. Operation During End Point Determinations

In order to analyze end point determinations, the operator places a blank sample containing a known concentration of a desired substance in the number 1 position of the carrousel (FIG. 1). The coded hole set associated with position 1 is arranged to be decoded by NAND gate 637b5 (FIG. 27). The operator moves the rate-end point switch to the end point position. That is, wipers 626a5 and 626b5 are moved into contact with contacts 624a5 and 624b5, respectively (FIG. 27). In addition, wiper 626b11 is moved away from contact 624c11 (FIG. 33), and switch 557 is moved to either the 5 minute, 10 minute or 20 minute position. As soon as start switch 550 is depressed, gates 560 begin to produce the pulses shown in FIG. 38a. These pulses are the same as those produced during the first revolution of a slow rate determination, except that the read pulse S3 and the up-down pulse S5 are disabled. In other words, as far as the operator is aware, only the dispenser assembly is working. During the first revolution, the dispenser assembly transfers fluid from each of the test tubes into a corresponding cuvette compartment in the manner described previously.

Figure 38A:
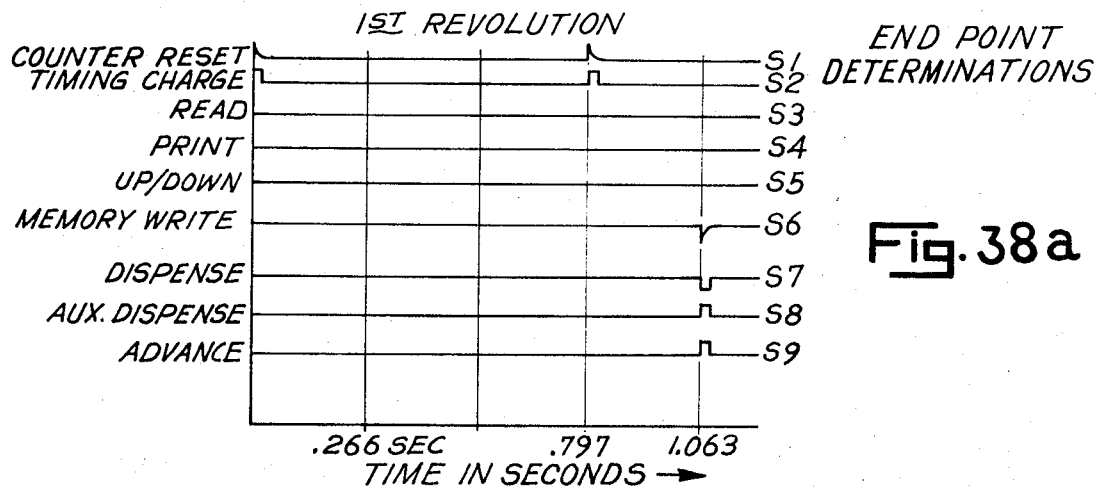
Figure 38B:
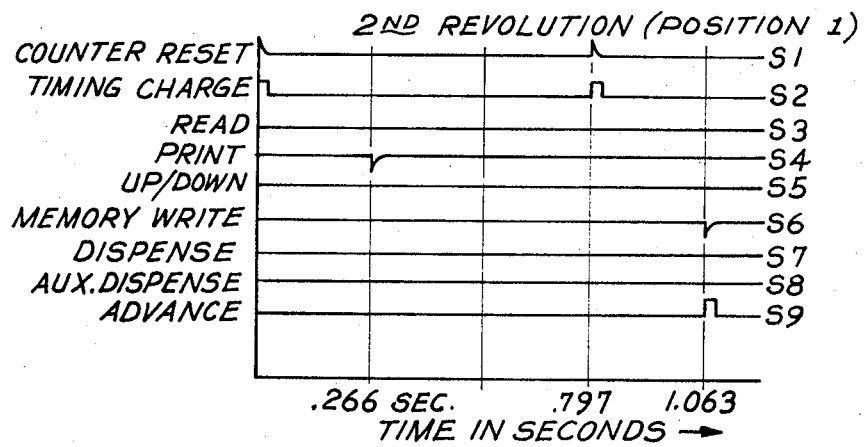

As the second revolution begins, position 1 is in the analyzing position so that phototransistors 154 read the identity code which switches NAND gate 637b5 (FIG. 27) to its zero state. This enables OR gate 684f5 which, in turn, causes the value of the blank sample to be read into the memory modules. In position 1, NAND gate 637a5 disables OR gate 684a11 (FIG. 33) so that no read pulse S3 is produced. As a result, in position 1, the pulses shown in FIG. 38b are produced in order to write the current value of the blank specimen into the memory module.

Figure 38C:
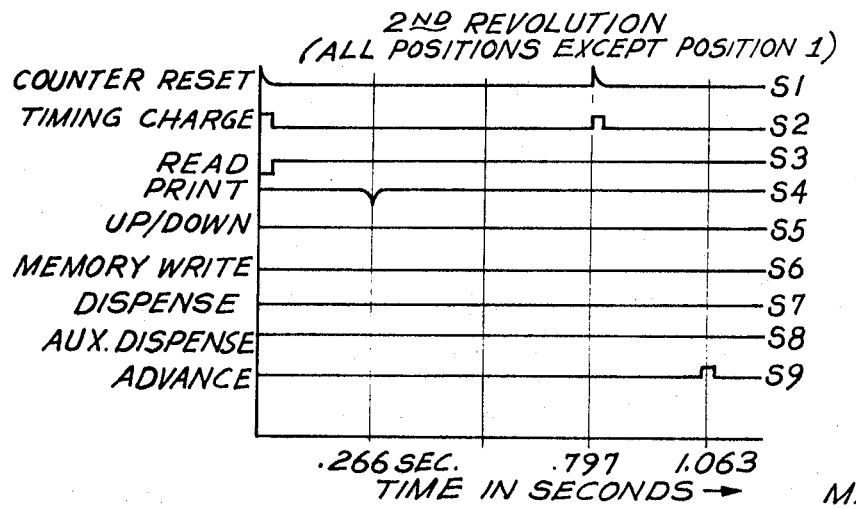

In every position except position 1, during the second revolution, gates 560 produce signals S1–S9 as shown in FIG. 38c. As each specimen is moved into the analyzing position, the counter modules are cleared to a zero value by signal S1 and the value of the blank specimen stored in memory module 644 is loaded into counter modules 636 by signal S3. Timing charge signal S2 then enables the analyzing apparatus to produce an anlaysis signal. Since up-down gate 534 is locked into the up count mode during end point determinations, the value of the specimen in the analyzing position is subtracted from the value of the blank specimen to produce a remainder value in the counter modules. The remainder value is displayed on display device 563 and is printed by printer 564 in response to print signal S4. Thereafter, the advance pulse S9 causes the next specimen to be moved into the analyzing position where it value is again compared with value of the blank specimen.

At the beginning of the third revolution, the blank specimen in position 1 again has its value analyzed and written into the memory module through gates 637b5 and 624b5 (FIG. 27). Thereafter, if a third revolution takes place, the values of each of the other specimens are compared with the revised value of the blank specimen in the same manner as during the second revolution.

Of course, end point determinations can be made by using distilled water as a blank specimen by merely arranging the apparatus to print out the value of each of the specimens as it is analyzed. In this regard, the system is particularly valuable, because the determinations can be made while the reaction is proceeding. This results from the fact that each of the specimens are dispensed at periods of time separated by a specific time interval, and the specimens are analyzed at periods of time separated by the same interval.

As in the case of rate determinations, as soon as the carrousel has advanced to the number of revolutions registered in the revolution select circuit 572, the operating selector 548 is switched in order to turn off the system and ring bell 586 as soon as the carrousel advances to a position in which no test tube is present. Alternatively, if a test tube is located in each carrousel position, operating selector 548 is switched at the end of the revolution.

Those skilled in the art will appreciate that the specific embodiments described herein may be altered and changed by those skilled in the art without departing from the true spirit and scope of the invention which is defined in the appended claims.

What is claimed is:

1. A system for analyzing reactions which take place within a plurality of individual specimens comprising:
   curvette means for holding each of the specimens in an individual compartment;
   analyzing means for generating and transmitting a beam of radiant energy through the specimens and for producing an analysis signal having a value proportional to a property of a predetermined specimen each time the beam passes through the predetermined specimen;
   cycling means for causing the beam to sequentially pass through predetermined ones of the specimens during predetermined cycles of operation to produce a set of analysis signals, each said analysis signal having a value corresponding to one of the predetermined specimens;
   converter means for converting each analysis signal into a corresponding digital signal representing a digital number;
   address means for generating an identity code that uniquely identifies each of the predetermined specimens;
   memory means for storing at least one of the digital numbers at an address corresponding to a particular one of the predetermined specimens; and
   electronic processing means for enabling the cycling means and for comparing the one or more digital numbers stored in the memory means with additional digital numbers created by the analyzing means and cycling means in order to analyze the reaction of the predetermined specimens.

2. A system, as claimed in claim 1, wherein the memory means comprises semiconductor means for storing a plurality of first data bits at an address, for reading out the plurality of first data bits, and for storing at said address a plurality of second data bits different from the first data bits in response to electrical control signals.

3. A system, as claimed in claim 1, wherein said converter means comprises:
   pulse generator means for producing generated pulses at a predetermined rate;
   counting means for counting said generating pulses;
   gate means for transmitting the generated pulses to the counting means in a number proportional to the value of an analysis signal and;
   means for selectively enabling the counting means to count in either one of two directions, whereby reactions resulting in either greater or lesser radiant energy absorption by the specimen may be analyzed.

4. A system, as claimed in claim 1, wherein the processing means comprises:
   a source of signals;
   clock means for dividing the signals and for producing a plurality of start pulses at predetermined time intervals;
   gate means for producing control pulses in response to a start pulse;
   means for counting the cycles of operation of the cycling means and for disabling certain of the gate means during predetermined and programmable cycles of operation of the cycling means; and
   means for transmitting predetermined ones of the start pulses to the gate means, whereby the cycling means is operated at a predetermined rate.

5. A system for analyzing a first specimen and a second specimen comprising:
   curvette means for holding the first and second specimens individually;
   analyzing means for generating an analyzing beam adapted to pass through the first and second specimens to produce a transmitted beam and for converting each such transmitted beam into an electrical analysis signal having a value proportional to a property of the corresponding first or second specimen;
   cycling means for moving the cuvette means and the analyzing means into a first position in which the analyzing beam is directed through the first specimen and for moving the cuvette means and the analyzing means into a second position in which the analyzing beam is directed through the second specimen during each cycle of operation;
   first processing means for causing the cycling means to complete at least a first cycle of operation, whereby a first analysis signal having a first value is created at the first position and a second analysis signal having a second value is created at the second position;
   converter means for converting the first analysis signal into a corresponding first digital signal representing a first digital number and for converting the second analysis signal into a corresponding second digital signal representing a second digital number;
   memory means for storing at least the first digital number; and
   second electronic processing means for reading the first digial number from memory and for comparing at least the first and second digital numbers, whereby at least the first and second specimens are compared.

6. A system, as claimed in claim 5, wherein said converter means comprises:
   pulse generator means for producing generating pulses at a predetermined rate;
   counting means for counting said generated pulses;
   gate means for transmitting the generated pulses to the counting means in a number proportional to the value of an analysis signal and;
   means for selectively enabling the counting means to count in either one of two directions, whereby reactions resulting in either greater or lesser radiant energy absorption by the specimen may be analyzed.

7. A system, as claimed in claim 6, wherein the first and second processing means comprise:
- first means for energizing the cycling means whereby the cuvette means and analyzing means are moved with respect to each other so that the analyzing beam is trans-mitted through the first specimen;
- second means for energizing the analyzing means to produce the first digital signal corresponding to the first specimen and for entering the first digital signal representing the first digital number in the counting means;
- third means for transmitting the first digital number entered in the counting means to the memory means;
- fourth means for storing the first digital number in the memory means;
- fifth means for energizing the cycling means whereby the cuvette means and the analyzing means are moved with respect to each other so that the analyzing beam is trans-mitted through the second specimen;
- sixth means for entering in the counting means the first digital number; and
- seventh means for energizing the analyzing means to produce the second digital signal representing the second digital number corresponding to the second specimen and for subtracting the second digital number from the first digital number entered in the counting means to produce a remainder digital number.

8. A system for analyzing a first specimen and a second specimen comprising:
- cuvette means for holding the first and second specimens individually;
- analyzing means for generating an analyzing beam adapted to pass through the first and second specimens to produce a transmitted beam and for converting each such transmitted beam into an electrical analysis signal having a value proportional to a property of the corresponding first or second specimen;
- cycling means for moving the cuvette means and the analyzing means into a first position in which the analyzing beam is directed through the first specimen and for moving the cuvette means and the analyzing means into a second position in which the analyzing beam is directed through the second specimen during each cycle of operation;
- first processing means for causing the cycling means to complete a first cycle of operation, whereby a first analysis signal having a first value is created at the first position and a second analysis signal having a second value is created at the second position and for causing the cycling means to complete a second cycle of operation, whereby a third analysis signal having a third value is created at the first position in a predetermined time period after the first analysis signal and a fourth value is created at the second position in said predetermined time period after the second analysis signal;
- converter means for converting the first analysis signal into a corresponding first digital signal representing a first digital number, for converting the second analysis signal into a corresponding second digital signal representing a second digital number, for converting the third analysis signal into a corresponding third digital signal representing a third digital number and for converting the fourth analysis signal into a corresponding fourth digital signal representing a fourth digital number;
- memory means for storing the first and second digital numbers during the first cycle of operation; and
- second electronic processing means operative during the second cycle of operation for comparing the first and third digital numbers and for comparing the second and fourth digital numbers, whereby the rates of reaction of the first and second specimens are determined.

9. A system, as claimed in claim 8, wherein said converter means comprises:
- pulse generator means for producing generated pulses at a predetermined rate;
- counting means for counting said generated pulses;
- gate means for transmitting the generated pulses to the counting means in a number proportional to the value of an analysis signal; and
- means for selectively enabling the counting means to count in either one of two directions, whereby reactions resulting in either greater or lesser radiant energy absorp-tion by the specimen may be analyzed.

10. A system, as claimed in claim 9, wherein said first and second processing means comprise:
- first means for energizing the cycling means whereby the cuvette means and the analyzing means are moved with respect to each other so that the beam is transmitted through a predetermined one of the specimens;
- second means for entering in the counting means the stored digital number stored in the memory means which corresponds to the predetermined specimen;
- third means for energizing the analyzing means to produce a current digital signal representing a current digital number corresponding to the predetermined specimen and for subtracting the current digital number from the stored digital number to produce a remainder digital number;
- fourth means for energizing the display means, whereby the remainder digital number is displayed;
- fifth means for energizing the analyzing means to produce in the counting means a storable digital signal representing a storable digital number corresponding to the predetermined specimen;
- sixth means for transferring the storable digital number entered in the counting means to the predetermined memory means; and
- seventh means for energizing the cycling means whereby the cuvette means and the analyzing means are moved with respect to each other so that the beam is transmitted through another one of the specimens.

11. A system, as claimed in claim 10, wherein said second means comprises means for causing said counting means to count in a first direction and said third means comprises means for causing said counting means to count in a direction opposite said first direction.

12. A system, for analyzing a specimen comprising:
- cuvette means for holding the specimen;
- analyzing means for generating an analyzing beam adapted to pass through the specimen to produce a transmitted beam and for converting the transmitted beam into an electrical analysis signal having a value that changes in proportion to a property of the specimen;

converter means for converting each analysis signal into a corresponding digital signal representing a digital number;

positioning means for supporting the cuvette means and the analyzing means in a position in which the analyzing beam is directed through the specimen;

memory means for storing the value of the analysis signal;

first processing means for cyclically storing in the memory means the digital numbers corresponding to the values of the analysis signal at points of time displaced by a predetermined time period; and second electronic processing means for comparing the digital numbers cyclically stored in the memory means, whereby the rate of reaction of the specimen is determined.

13. A system, as claimed in claim 12, wherein said converter means comprises:

pulse generator means for producing generated pulses at a predetermined rate;

digital counting means for counting said generated pulses;

gate means for transmitting the generated pulses to the counting means in a number proportional to the value of an analysis signal; and means for selectively enabling the counting means to count in either one of two directions, whereby reactions resulting in either greater or lesser radiant energy absorp-tion by the specimen may be analyzed.

14. A system, as claimed in claim 13, wherein the first and second processing means comprise:

first means for entering in the counting means a stored digital number stored in the memory means which coresponds to the specimen;

second means for energizing the analyzing means to produce a current digital signal representing a current digital number corresponding to the specimen and for subtracting the current digital number from the stored digital number entered in the counting means to produce a remainder digital number;

third means for energizing the analyzing means to produce in the counting means a storable digital signal representing a storable digital number corresponding to the specimen; and fourth means for transferring the storable digital number entered in the counting means to the memory means, so that the storable digital number may be subsequently compared with another digital number derived from another analysis signal whereby the rate of reaction occurring within the specimen is determined.

15. A system, as claimed in claim 14, wherein the first processing means comprises clock means for producing clock pulses displaced in time by a predetermined time period so that the values cyclically stored in the memory means are compared at points of time displaced by the predetermined time period.

* * * * *